United States Patent
Hatamura

(10) Patent No.: US 8,065,988 B2
(45) Date of Patent: Nov. 29, 2011

(54) FOUR-CYCLE ENGINE

(76) Inventor: Koichi Hatamura, Yachiyo (JP)

( * ) Notice: Subject to any disclaimer, the term of this patent is extended or adjusted under 35 U.S.C. 154(b) by 560 days.

(21) Appl. No.: 12/279,281

(22) PCT Filed: Feb. 9, 2007

(86) PCT No.: PCT/JP2007/052334
§ 371 (c)(1),
(2), (4) Date: Oct. 3, 2008

(87) PCT Pub. No.: WO2007/094251
PCT Pub. Date: Aug. 23, 2007

(65) Prior Publication Data
US 2009/0025697 A1    Jan. 29, 2009

(30) Foreign Application Priority Data

Feb. 13, 2006   (JP) ................ 2006-035589

(51) Int. Cl.
*F02D 13/00*    (2006.01)
(52) U.S. Cl. .................. 123/347; 123/568.19
(58) Field of Classification Search .......... 123/321, 123/322, 345–348, 568.11, 568.21–568.24
See application file for complete search history.

(56) References Cited

U.S. PATENT DOCUMENTS

| | | | | |
|---|---|---|---|---|
| 4,630,575 A | * | 12/1986 | Hatamura et al. | 123/184.48 |
| 5,682,854 A | | 11/1997 | Ozawa | |
| 7,263,985 B2 | * | 9/2007 | Kaneko | 123/670 |
| 2006/0169246 A1 | * | 8/2006 | Asai | 123/305 |

FOREIGN PATENT DOCUMENTS

| | | |
|---|---|---|
| JP | 51-34526 B | 9/1976 |
| JP | 56-023521 A | 3/1981 |
| JP | 1-134735 U | 9/1989 |
| JP | 5-86992 A | 4/1993 |
| JP | 5-187326 A | 7/1993 |
| JP | 7-259655 A | 10/1995 |
| JP | 11-264319 A | 9/1999 |
| JP | 2000-199440 A | 7/2000 |
| JP | 2001-159374 A | 6/2001 |
| JP | 2005-61325 A | 3/2005 |

OTHER PUBLICATIONS

Kanesaka, H., "New Starting Aid for Low Compression Ratio Diesel Engines", 1980, pp. 1-7, No. 80-DGP-8, The American Society of Mechanical Engineers.
Kijima, K. et al. "'Combined EGR System', A Development of New Technology for NOx Reduction", 2004, pp. 15-18, No. 69-04, 20045094, Society of Automotive Engineers of Japan.

* cited by examiner

*Primary Examiner* — John Kwon
(74) *Attorney, Agent, or Firm* — Smith Patent Office

(57) ABSTRACT

An average pressure P12 in an exhaust port at an overlap period T12 during which a period T1 during which an exhaust valve of a first cylinder unit is in an EGR opening state overlaps with a period T2 during which an intake valve of the first cylinder unit is in an opening state is set to be lower than an average pressure P12' in the exhaust port within the EGR opening period T1 and after a lapse of the overlap period T12, or an overlapped opening time area S2 at the overlap period T12 is set to be not more than one-fourth of an opening time area S1 at the EGR opening period T1.

13 Claims, 20 Drawing Sheets

FIG. 3
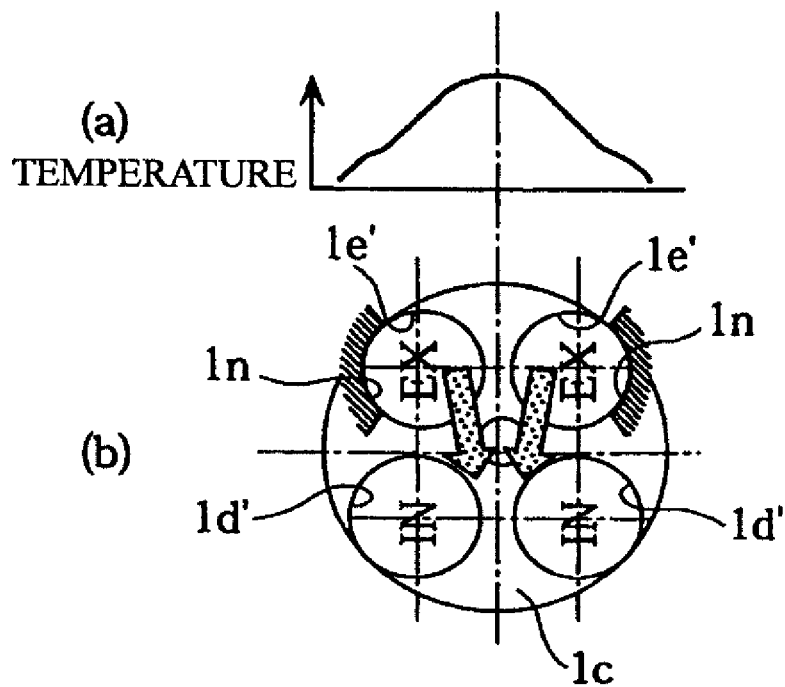
(a) TEMPERATURE
(b)
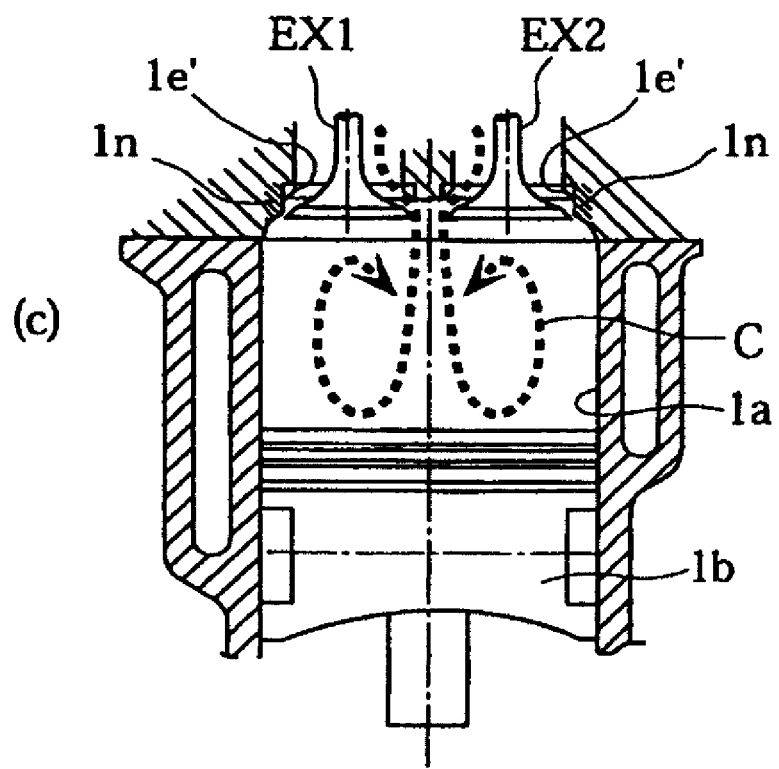
(c)

FIG. 20
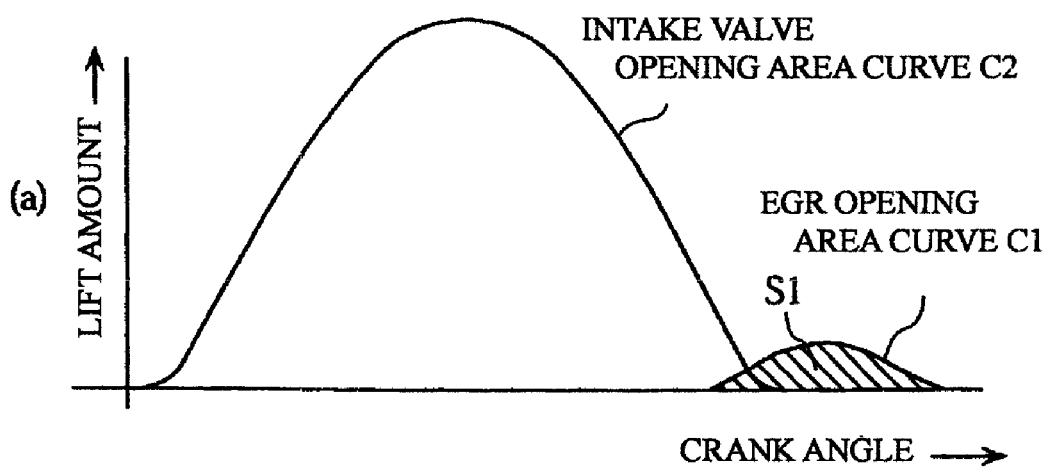
(a)
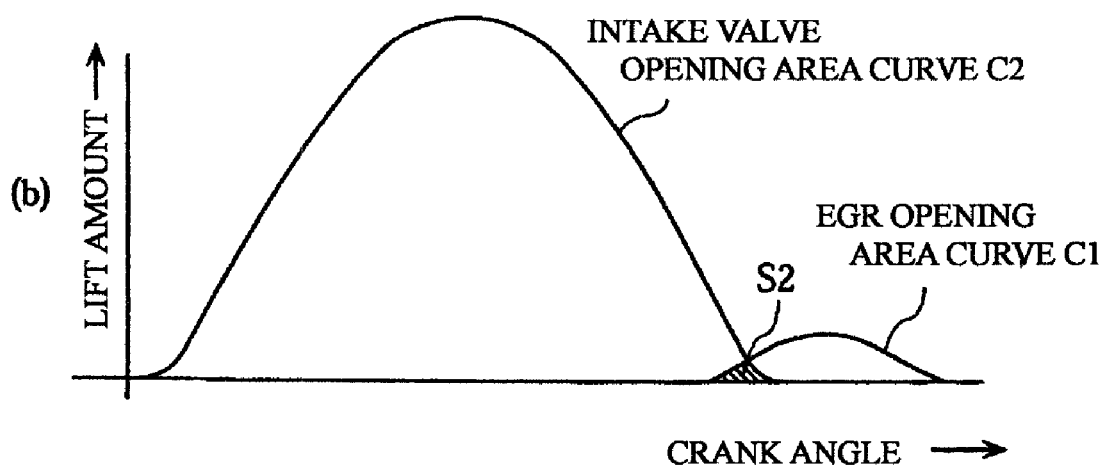
(b)

FOUR-CYCLE ENGINE

TECHNICAL FIELD

The present invention relates to a four-cycle engine in which fresh air and EGR gas are fed into a cylinder. Specifically, the present invention relates to a four-cycle engine that adopts a simple configuration, thereby preventing a feed amount of fresh air from being reduced and increasing a feed amount of EGR gas.

BACKGROUND ART

A typical diesel engine injects and supplies fuel around a compression top dead center. On the other hand, a homogeneous charge compression ignition (HCCI) engine is of a type that fuel is injected into a combustion chamber at an early stage or fuel is mixed with air in an intake port, so that premixed gas is self-ignited around a compression top dead center by a combustion reaction at a compression temperature.

Such an HCCI combustion system that dilute premixed gas is burned by self-ignition almost simultaneously in an entire combustion chamber has the following features. That is, the HCCI combustion system achieves high combustion efficiency which is comparable to a diesel engine, generates few soot like a gasoline engine, and considerably suppresses generation of NOx.

In order to realize the HCCI combustion, there have been widely studied an engine based on a gasoline engine and an engine based on a diesel engine.

The former engine uses gasoline as fuel. In a high-load operation and a low-load operation, the engine performs spark ignition combustion like a conventional gasoline engine. In a middle-load HCCI operation, on the other hand, the engine utilizes a large amount of high-temperature EGR gas in order to compensate a low compression ratio and to achieve a compression temperature required for self-ignition. When the high-temperature EGR gas is fed into the combustion chamber, fresh air corresponding to a volume of the fed high-temperature EGR gas is reduced, resulting in considerable reduction of a mass of entire mixed gas added with the EGR gas. Thus, a thermal capacity of the mixed gas decreases while a combustion temperature increases, so that a large amount of NOx is generated. Consequently, a supply amount of fuel can not be increased.

The latter engine uses gas oil as fuel. In a high-load operation and an extremely low-load operation, the engine performs diesel combustion like a conventional diesel engine. In a middle-load operation, on the other hand, the engine advances a fuel injection timing and, then, suppresses ignition by feed of a large amount of cooled EGR gas to ensure a sufficient premixing time until the ignition. Thus, the engine realizes HCCI or combustion close to the HCCI. However, since fresh air is reduced in amount due to the feed of the large amount of EGR gas, soot is generated due to lack of oxygen. Consequently, a supply amount of fuel can not be increased. Herein, the ignition can also be suppressed by lowering a compression ratio. However, such a compression ratio can not be lowered so much because startability and low-temperature combustion become deteriorated.

For these reasons, if such an HCCI engine is used for an automobile, an HCCI operation is limited to a low-to-middle load region due to a main factor that the amount of fresh air is reduced by feed of the EGR gas. Consequently, there arises a problem that improvement in fuel economy and performance of exhaust gas in HCCI can not be achieved satisfactorily in actual run.

JP 51-034526 B, JP 2005-061325 A and JSAE20045094 propose a method of opening an exhaust valve again in an intake stroke to increase an amount of EGR gas at a high load in which feed of the EGR gas becomes difficult. On the other hand, Non-patent document 1 proposes a method of feeding high-temperature EGR gas from an exhaust port into a cylinder at a low temperature.

DISCLOSURE OF THE INVENTION

Problems to be Solved by the Invention

In an engine described in JP 2005-061325 A, reduction in aspiration amount of fresh air is taken into consideration. However, a period of EGR opening is mainly set to the intake stroke. Therefore, the EGR gas is used for making up for a capacity of a cylinder due to a downward movement of a piston, but is not positively used for increasing a pressure in the cylinder. In addition, increase in exhaust pressure by exhaust throttling disadvantageously causes increase in pump loss and deterioration in fuel economy. Consequently, it is not realistic that the exhaust pressure is increased to a pressure required for increasing a pressure in the cylinder. At a high load, moreover, the EGR gas is fed on the course of the intake stroke, resulting in restriction to the amount of fresh air. Consequently, an HCCI operating region can not be widened sufficiently. In addition, since the engine is premised on a complicated variable valve mechanism such as a solenoid valve, there arises significant problems concerning driving energy loss and cost.

In the engine described in ASME80-DGP-8, special exhaust throttling is required for performing EGR opening under acceleration. Further, soot is readily generated because the amount of fresh air is reduced as the EGR gas is fed. Moreover, the increase in exhaust pressure by the exhaust throttling leads to pump loss, resulting in deterioration of fuel economy. If the engine has no variable mechanism, reduction in output is inevitable.

The engine described in JP 51-034526 B is not in practical use because it requires a complicated mechanism such as an exhaust rotary valve. On the other hand, the engine described in JSAE20045094 achieves increase in amount of the EGR gas; however, reduction in aspiration amount of the fresh air is inevitable.

An object of the present invention is to provide a four-cycle engine with low fuel consumption capable of increasing an amount of EGR gas without requiring a complicated variable mechanism or the like and without reducing an amount of fresh air and, therefore, capable of allowing an HCCI operation under acceleration and minimizing reduction in output while taking countermeasures against exhaust gas.

Means for Solving the Problems, and Effects Thereof

According to a first aspect of the present invention, a four-cycle engine is configured to cause backflow of high-pressure exhaust gas from a second cylinder unit side into a cylinder of a first cylinder unit by EGR opening that an exhaust valve of the first cylinder unit is reopened around a bottom dead center from an intake stroke to a compression stroke of the first cylinder unit, and to set a pressure in the cylinder to be higher than a pressure in an intake port at starting of the compression stroke of the first cylinder unit. Herein, an average pressure in an exhaust port at an overlap period during which a period during which the exhaust valve of the first cylinder unit is in an EGR opening state overlaps with a period during which an intake valve of the first cylinder unit is in an opening state is set to be lower than an average pressure in the exhaust port within the EGR opening period and after a lapse of the overlap period, or an overlapped opening time area at the overlap period is set to be not more than one-fourth of an opening time area at the EGR opening period.

As shown in FIG. 20 in which a vertical axis indicates a lift amount representing an area of an opening portion for the EGR opening and a horizontal axis indicates a crank angle, herein, the opening time area refers to an area S1 surrounded by an EGR opening area curve C1 by the EGR opening and the horizontal axis ((a) of FIG. 20). Moreover, the overlapped opening time area at the overlap period refers to a triangular area S2 surrounded by the EGR opening area curve C1, an intake valve opening area curve C2 and the horizontal axis ((b) of FIG. 20).

Moreover, the four-cycle engine according to the first aspect of the present invention includes a reciprocating engine and a rotary engine. In a case of the rotary engine, the foregoing description "by EGR opening that an exhaust valve of the first cylinder unit is reopened around a bottom dead center from an intake stroke to a compression stroke of the first cylinder unit" refers to "by forming an EGR port in a form of an opening portion at a position near a compression stroke starting position of a combustion chamber of a first cylinder unit, establishing communicative connection between the EGR port and an exhaust port of a second cylinder unit though an exhaust and feed passage, providing an EGR open/close valve on the exhaust and feed passage, and opening the EGR open/close valve around a timing of change from an intake stroke to an exhaust stroke", for example.

According to the first aspect of the present invention, the exhaust pressure at the overlap period is set to be low or the overlapped opening time area at the overlap period is set to be small; therefore, the fresh air aspirated into the cylinder can be prevented from being pushed back to the intake port side by the EGR gas.

Moreover, the exhaust pressure after the lapse of the overlap period is set to be higher or the opening time area after the lapse of the overlap period is set to be larger; therefore, the large amount of EGR gas can be pushed into the cylinder and, simultaneously, the pressure in the cylinder can be increased by a pressure of the EGR gas.

In a case of an HCCI engine based on a gasoline engine, EGR gas is pushed into a cylinder, so that a pressure in the cylinder is increased around a bottom dead center of an intake stroke. Then, fresh air that has flown into the cylinder before the EGR gas is pushed into the cylinder is adiabatically compressed, so that a temperature thereof increases. Further, since a pressure at a compression top dead center also increases, a compression temperature required for self-ignition decreases. By the two effects, the amount of EGR gas required for HCCI combustion decreases; therefore, the amount of fresh air can be prevented from being reduced due to the feed of the EGR gas.

In an HCCI engine based on a diesel engine, on the other hand, EGR gas is pushed into a cylinder without push-out of fresh air and cooled EGR gas each aspirated into the cylinder at an intake valve open period, leading to increase in mass of the gas in the cylinder. Further, exhaust gas from the diesel engine contains oxygen; therefore, a mass of the oxygen in the cylinder also increases. As a result, increase in heat capacity of operating gas reduces a combustion temperature, leading to suppression in generation of NOx. Simultaneously, increase in amount of oxygen prevents generation of soot. It is needless to say that burned gas in the EGR gas reduces an oxygen concentration, so that a local combustion temperature decreases to achieve an NOx reducing effect, as in a case of a conventional diesel engine.

A second aspect of the present invention relates to an example of a specific configuration of a method of setting the average pressure in the exhaust port at the overlap period to be lower than the average pressure after the lapse of the overlap period, described in the first aspect of the present invention. Herein, the first and second cylinder units are different in phase from each other by a half cycle, that is, 360° in the case of the reciprocating engine and 540° in the case of the rotary engine, and are connected to a common exhaust system. Further, an EGR opening period of the exhaust valve of the first cylinder unit, an exhaust valve open timing in an expansion stroke of the second cylinder unit, and a length of an exhaust passage provided between the first and second cylinder units are set such that most of a primary pressure wave by exhaust blowdown from the second cylinder unit arrives at an opening portion of the exhaust valve of the first cylinder unit within the EGR opening period of the exhaust valve of the first cylinder unit and after the lapse of the overlap period, in at least a middle-load operating region.

According to the second aspect of the present invention, the primary pressure wave from the second cylinder unit hardly arrives at the exhaust port of the first cylinder unit at the overlap period; therefore, the pressure in the exhaust port is low. Accordingly, the EGR gas hardly pushes out the fresh air from the cylinder. On the other hand, most of the primary pressure wave arrives after the lapse of the overlap period; therefore, the pressure in the exhaust port becomes high. In addition, a degree of the EGR opening becomes sufficiently high, so that the large amount of EGR gas is pushed into the cylinder and the pressure in the cylinder increases. Of course, since the overlap period has elapsed at this time, the intake valve is closed; therefore, the fresh air is prevented from being pushed out by the EGR gas.

It is desirable that the overlap period is not set at zero because provision of an overlap period to some extent allows enlargement of a degree of EGR opening after a lapse of the overlap period and, accordingly, allows increase in feed amount of the EGR gas. On a specific operating condition that the pressure in the intake port is higher than the pressure in the exhaust port at the overlap period, moreover, fresh air flows into the exhaust port via a cylinder bore at the overlap period, and is aspirated again when the primary pressure wave arrives. This allows further compensation of reduction in amount of the fresh air.

A third aspect of the present invention relates to a specific example of a case of setting the pressing in the cylinder to be higher than the pressure in the intake port in the first aspect of the present invention. Herein, the exhaust system connected to the first and second cylinder units includes an exhaust throttling mechanism that increases a back pressure of the exhaust system to cause the backflow of the high-pressure exhaust gas into the cylinder. Further, in the exhaust valve of the first cylinder unit, a lift amount at a central point (a point that lift curves intersect) of the overlap period is set to be not more than a half of a maximum lift amount in the EGR opening operation.

According to the third aspect of the present invention, the lift amount at the center of the overlap period, that is, the intersection between the lift curves is not more than a half of the maximum lift amount of the EGR cam; therefore, the overlap period becomes short. Accordingly, the period after a lapse of the overlap period becomes long. As a result, the amount fresh air to be pushed out is reduced while the amount of EGR gas to be pushed into is increased.

A fourth aspect of the present invention relates to a specific example of a case of reducing the overlapped opening time area of the overlap period, in the first aspect of the present invention. Herein, the exhaust system connected to the first and second cylinder units includes an exhaust throttling mechanism that increases a back pressure of the exhaust system to cause the backflow of the high-pressure exhaust gas into the cylinder. Moreover, the intake valve of the first cylinder unit is closed after the bottom dead center. Further, the exhaust valve of the first cylinder unit is opened before the intake valve of the first cylinder unit is closed and achieves maximum lift after the intake valve is closed, in the EGR opening operation.

According to the fourth aspect of the present invention, the intake valve is closed after the bottom dead center, and then the maximum lift of the EGR opening is obtained. Therefore, the fresh air is aspirated fully in the intake stroke, so that the amount of fresh air can be increased, and the large amount of EGR gas can be pushed into without push-out of the fresh air. Moreover, the intake valve is closed, and then the maximum lift in the EGR opening is obtained; therefore, the overlapped opening time period at the overlap period becomes small while the opening time area after the lapse of the overlap period becomes large. In light of this point, also, the amount of fresh air to be pushed out is reduced while the amount EGR gas to be pushed into is increased.

According to a fifth aspect of the present invention, in the third or fourth aspect of the present invention, the exhaust throttling mechanism is a west gate-equipped or variable nozzle-type turbocharger having turbo lag that increase in intake pressure is slower than increase in exhaust pressure in a transient acceleration operating region, and the west gate or the nozzle is controlled in a direction that exhaust resistance becomes large.

According to the fifth aspect of the present invention, the west-gate equipped or variable nozzle-type turbocharger is provided as the exhaust throttling mechanism. In the transient acceleration operating region, therefore, the exhaust pressure automatically becomes higher than the intake pressure, so that the large amount of EGR gas can be fed into the cylinder. The exhaust pressure is not increased especially in order to achieve this advantage; therefore, no pump loss increases and no fuel economy becomes deteriorated due to the EGR gas supercharging. In a turbocharger engine, on the other hand, an intake pressure increases in a stationary high-load operation and tends to be equal to or higher than an exhaust pressure, and EGR gas is reduced automatically; therefore, almost no harmful effect of reduction in output occurs.

According to a sixth aspect of the present invention, in the second aspect of the present invention, when at least one of the EGR opening timing and period of the exhaust valve of the first cylinder unit, the close timing of the intake valve of the first cylinder unit, and the open timing of the exhaust valve of the second cylinder unit in the expansion stroke is changed, an amount of fresh air to be fed into the first cylinder unit, an amount of EGR gas to be fed into the first cylinder unit and the pressure in the cylinder at the starting of the compression stroke of the first cylinder unit are controlled.

In a middle-load region, for example, an amount of fresh air should not be reduced, but an amount of EGR gas should be increased. In a low-load region, on the other hand, the amount of fresh air should be increased, and the amount of EGR gas should be increased. In a high-load region, moreover, the amount of EGR gas should be reduced, but the amount of fresh air should be increased. As described above, an intake valve open/close state, an exhaust valve open/close state and an EGR opening state must be controlled in accordance with an operating region.

According to the sixth aspect of the present invention, the amount of fresh air, the amount of EGR gas and the pressure in the cylinder are controlled. This control can correspond to change in operating region of the engine.

A seventh aspect of the present invention relates to a configuration for realizing the control of the open/close state of the intake valve, the open/close state of the exhaust valve and the EGR opening state of the exhaust valve, described in the sixth aspect of the present invention. Herein, the four-cycle engine includes: an exhaust cam shaft and an intake cam shaft; an EGR cam formed on the intake cam shaft to reopen the exhaust valve of the first cylinder unit around the bottom dead center of the intake stroke; an exhaust valve driving mechanism transmitting the operation of the EGR cam to the exhaust valve; and a cam phase variable mechanism changing a phase of one of or each of the intake cam shaft and the exhaust cam shaft.

In the seventh aspect of the present invention, when the phase of the intake cam shaft and the phase of the exhaust cam shaft are changed, the EGR opening timing of the exhaust valve of the first cylinder unit, the close timing of the intake valve of the first cylinder unit and the open timing of the exhaust valve of the second cylinder unit in the expansion stroke can be changed, so that the amount of fresh air to be fed into the first cylinder unit, the amount of EGR gas to be fed into the first cylinder unit and the pressure in the cylinder at the starting of the compression stroke can be controlled. Specifically, the phase of the exhaust cam and the phase of the EGR opening cam are changed independently in the expansion stroke, so that a phase difference between the EGR opening timing and the exhaust valve open timing can be adjusted in accordance with change in requirement of EGR gas supercharging according to operating conditions and change due to a rotation speed of a crank angle required for propagation of a pressure wave.

An eighth aspect of the present invention relates to one specific example of the control in the seventh aspect of the present invention. Herein, in a high-load operating region, the phase of one of or each of the intake cam shaft and the exhaust cam shaft is controlled such that most of the primary pressure wave by the exhaust blowdown from the second cylinder unit arrives at the opening portion of the exhaust valve of the first cylinder unit after a substantial lapse of the EGR opening period of the first cylinder unit.

According to the eighth aspect of the present invention, the EGR opening lift is small at the time when the primary pressure wave arrives and, in addition, the cylinder capacity is gradually reduced in the intake stroke; therefore, the feed of the EGR gas can be suppressed effectively.

A ninth aspect of the present invention relates to another specific example of the control in the seventh aspect of the present invention. Herein, in a low-load operating region, the phase of one of or each of the intake cam shaft and the exhaust cam shaft is controlled such that the intake valve of the first cylinder unit is closed before the bottom dead center and most of the primary pressure wave by the exhaust blowdown from the second cylinder unit arrives at the opening portion of the exhaust valve of the first cylinder unit during the EGR opening period of the first cylinder unit.

According to the ninth aspect of the present invention, most of the primary pressure wave by the exhaust blowdown from the second cylinder unit arrives at the opening portion of the exhaust valve of the first cylinder unit during the EGR opening period of the first cylinder unit. At the period that the intake valve is open, however, the piston is still moving downward and the cylinder capacity is being enlarged; therefore, the amount of EGR gas can be increased through effective use of the exhaust pressure wave, which is small because of the small load, without the push-out of the fresh air through the opening portion of the intake valve.

It is to be noted that the combustion property is improved even in the low-load operating region if the pressure increases by virtue of the supercharging effect; therefore, it is desirable that the phase of the pressure wave is made coincident such that the main portion of the primary pressure wave arrives at the exhaust port at the latter half of the EGR opening. That is, the coincidence in phase described above can avoid a disadvantage that if the pressure wave arrives to fast, the gas flows from the cylinder into the exhaust port at the latter period of the EGR opening, so that the increased cylinder pressure is decreased. If necessary, the pressure in the exhaust port may be increased through use of exhaust throttling. At a lower load, it is desirable that the temperature is increased by increasing the EGR ratio and, simultaneously, the A/F is made rich by reducing the amount of fresh air, so that the fuel economy is improved. In order to achieve this advantage, the intake valve close timing is advanced to reduce the amount of fresh air and the EGR opening is advanced in accordance with the advancement described above, and the exhaust cam is also advanced in order to maintain the phase of the pressure wave. Herein, when the intake cam shaft is provided with an EGR cam, the advancement of the intake valve close timing and the advancement of the EGR opening can be performed simultaneously. It is to be noted that the amount of fresh air may be reduced simultaneously through use of intake throttling.

According to a tenth aspect of the present invention, in the seventh aspect of the present invention, the exhaust valve driving mechanism is configured to switch on or switch off transmission of a driving force from the EGR cam to the exhaust valve.

According to the tenth aspect of the present invention, the exhaust valve driving mechanism for performing the EGR opening operation is configured so as to be switched on/off. Therefore, since the EGR opening operation can be stopped in the high-speed rotation and high-load operating region where no EGR opening operation is required, for example, it is possible to avoid a problem that the feed of the EGR gas hinders the increase of the engine output. Further, when the EGR cam is prevented from being operated at a high rotation, it is possible to obtain such a setting that higher valve lift can be achieved at a single open angle by increasing the acceleration of the cam lift.

According to an eleventh aspect of the present invention, in any one of the first to fourth aspects of the present invention, guide parts are formed at left and right edges of the opening portion of the exhaust valve in a cam axis direction so as to concentrate the EGR gas on a center of the cylinder.

According to the eleventh aspect of the present invention, the EGR gas can be oriented by the guide part so as to be concentrated on the center in the cam axis direction when flowing into the cylinder, so that the temperature distribution in the combustion chamber can be stratified around the compression top dead center. As a result, the self-ignition starts near the center of the cylinder which is high in temperature and, successively, the self-ignition occurs at a periphery where the temperature is low; therefore, the rapid combustion, which is one problem of the HCCI, can be made slow. Further, since the average compression temperature can be reduced, the amount of EGR gas to be required can be reduced.

According to a twelfth aspect of the present invention, in any one of the first to fourth and eleventh aspects of the present invention, a turning direction of a tumble flow generated when the EGR gas flows into the cylinder is equal to a turning direction of a tumble flow generated by a fresh air flow from the intake valve.

According to the twelfth aspect of the present invention, the tumble flow of the EGR gas is turned in the same direction as that of the tumble flow by the fresh air flow; therefore, it is possible to avoid problems that the EGR gas and the fresh air are mixed together due to the collision of the both flows and the tumble flows become weak. Further, since the strong tumble flow can be maintained around the compression top dead center, the high-temperature EGR at the center can be prevented from being mixed with the low-temperature fresh air at the periphery in the compression stroke, and the temperature distribution can be stratified firmly.

According to a thirteenth aspect of the present invention, in any one of the first to fourth aspects of the present invention, the exhaust port is a tangential port generating a swirl flow flowing about a cylinder unit axis when the EGR gas flows into the cylinder, and a turning direction of the swirl flow of the EGR gas is equal to a turning direction of a swirl flow generated by a fresh air flow from the intake valve.

According to the thirteenth aspect of the present invention, the swirl flow of the EGR gas is turned in the same direction as that of the swirl flow by the fresh air flow, leading to avoidance of a problem that the swirl flows become weak due to collision therebetween.

BRIEF DESCRIPTION OF THE DRAWINGS

FIG. 3 shows temperature distribution in a piston portion of the engine according to the first embodiment.

FIG. 20 shows an EGR opening time area in the present invention.

DESCRIPTION OF REFERENCE SYMBOLS

Figure 1:
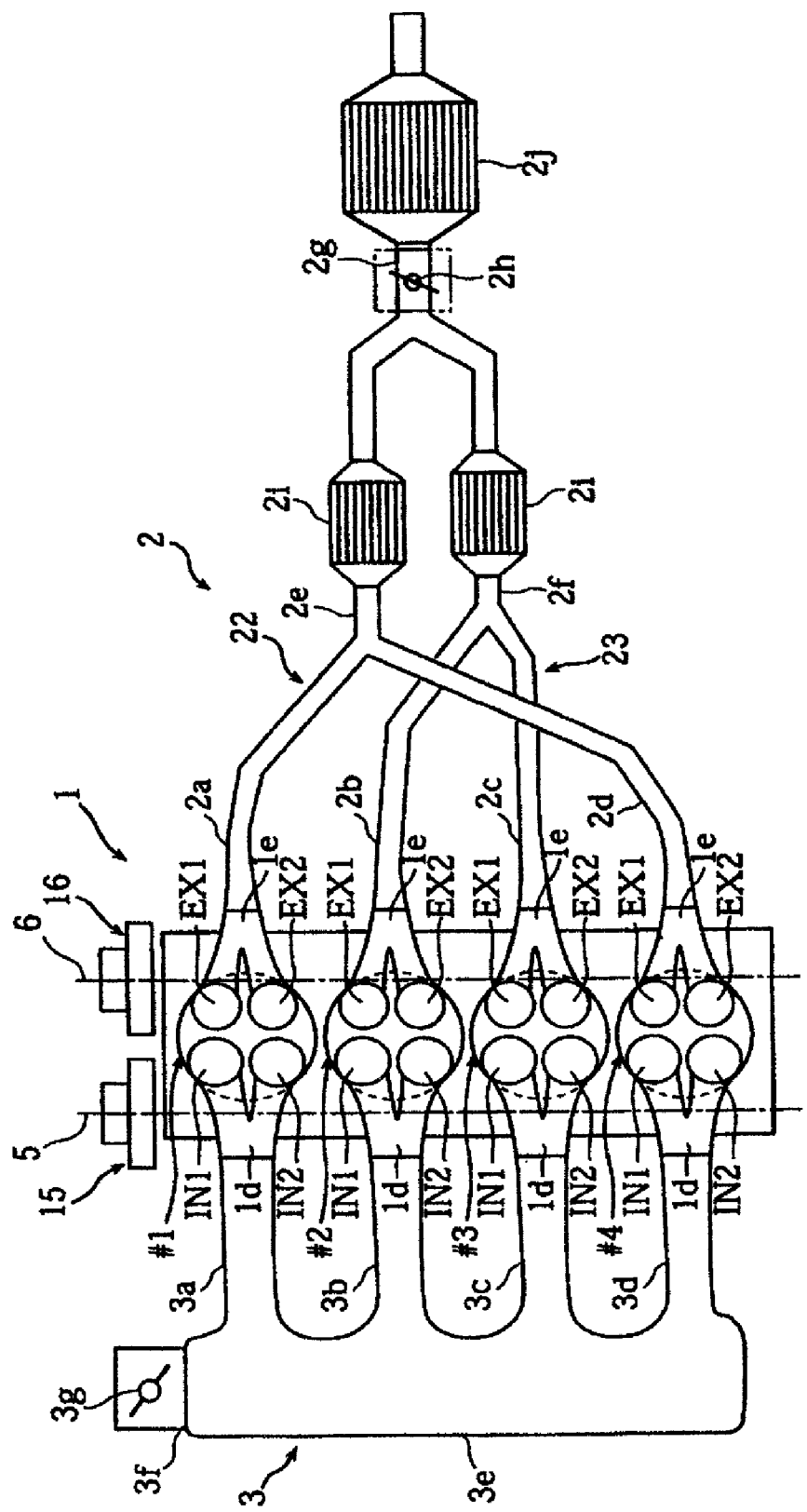
FIG. 1 shows a schematic configuration of an engine according to a first embodiment of the present invention.

1: Four-cycle engine
1n: Guide part
2a+2d: Length of exhaust passage provided between first and second cylinder units
5: Intake cam shaft
5a': EGR cam
6: Exhaust cam shaft
9: Exhaust valve driving mechanism
15, 16: Intake cam phase variable mechanism, exhaust cam phase variable mechanism
20: Rotary engine
27a, 27b: Turbocharger
B: Fresh air tumble flow
C: Exhaust gas tumble flow
T1: Period of EGR opening state
T2: Period of intake valve open state
T12: Overlap period
T12': Period after lapse of overlap period
1: First cylinder unit
4: Second cylinder unit

BEST MODE FOR CARRYING OUT THE INVENTION

With reference to the attached drawings, hereinafter, description will be given of preferred embodiments of the present invention.

FIGS. 1 to 10 show a four-cycle engine according to a first embodiment of the present invention. Specifically, FIG. 1 shows an entire configuration of the engine, FIGS. 2 to 5 show a structure of the engine, and FIGS. 6 to 10 show operations of the engine.

As shown in the figures, an HCCI engine 1 is based on a 4-valve DOHC gasoline engine. The engine 1 includes cylinder units #1 to #4. Each of the cylinder units #1 to #4 includes four valves in total, that is, two intake valves IN1 and IN2 and two exhaust valves EX1 and EX2. The engine 1 also includes a gasoline direct injection valve 13, and has a compression ratio set at 12 suitable for spark ignition combustion.

In the engine 1, the cylinder unit #1, the cylinder unit #3, the cylinder unit #4 and the cylinder unit #2 are ignited in this order. A phase (an ignition interval) between the respective cylinder units is 180° of a crank shaft angle. Accordingly, the phase between the cylinder units #1 and #4 and the phase between the cylinder units #2 and #3 are 360°, respectively. It is to be noted that a piston position in the cylinder unit #1 is constantly equal to that in the cylinder unit #4, and a piston position in the cylinder unit #2 is constantly equal to that in the cylinder unit #3. The piston position in each of the cylinder units #1 and #4 is different by 180° from the piston position in each of the cylinder units #2 and #3.

Next, description will be given of a specific structure of the engine 1. A piston 1b is slidably inserted into a cylinder bore 1a of each of the cylinder units #1 to #4. The piston 1b is coupled to a crank shaft (not shown) through a connecting rod 1f. A combustion chamber 1c is located above the cylinder bore 1a, and two intake valve opening portions 1d' of an intake port 1d and two exhaust valve opening portions 1e' of an exhaust port 1e are formed on the combustion chamber 1c. The intake valve IN1, the intake valve IN2, the exhaust valve EX1 and the exhaust valve EX2 open/close the opening portions described above, respectively.

The opening/closing of each of the intake valve IN1, the intake valve IN2, the exhaust valve EX1 and the exhaust valve EX2 is driven by a valve device 4. The valve device 4 includes an intake cam shaft 5 and an exhaust cam shaft 6 each arranged in parallel with the crank shaft, intake rocker levers 7 and 7 each rocked and driven by the intake cam shaft 5, and exhaust rocker levers 8 and 8 each rocked and driven by the exhaust cam shaft 6.

An intake cam nose 5a is formed on the intake cam shaft 5 for each cylinder unit so as to correspond to each intake valve. The intake cam nose 5a includes a base circular part 5b and a lift part 5c. Similarly, an exhaust cam nose 6a including a base circular part 6b and a lift part 6c is formed on the exhaust cam shaft 6 so as to correspond to each exhaust valve.

The intake rocker levers 7 and 7 are rockably supported by an intake rocker shaft 7a arranged in parallel with the crank shaft. Rollers 7b and 7b are rotatably supported at front sides of the intake rocker levers 7 and 7. When the intake cam shaft 5 is rotated, the intake cam noses 5a and 5a of the intake cam shaft 5 rock the intake rocker levers 7 and 7 through the rollers 7b and 7b, and then pressing parts 7c and 7c provided at tip ends of the intake rocker levers 7 and 7 press down the intake valves IN1 and IN2 in an open direction.

Similarly to the intake side, the exhaust rocker levers 8 and 8 are rockably supported by an exhaust rocker shaft 8a arranged in parallel with the crank shaft, and rollers 8b and 8b are rotatably supported at front sides of the exhaust rocker levers 8 and 8. When the exhaust cam shaft 6 is rotated, the exhaust cam noses 6a and 6a of the exhaust cam shaft 6 rock the exhaust rocker levers 8 and 8 through the rollers 8b and 8b, and then pressing parts 8c and 8c provided at tip ends of the exhaust rocker levers 8 and 8 press down the exhaust valves EX1 and EX2 in an open direction.

The valve device 4 in this embodiment includes an EGR opening mechanism 9 performing an EGR opening operation for reopening the exhaust valves EX1 and EX2 around a bottom dead center of an intake stroke through use of the intake cam shaft 5.

The EGR opening mechanism 9 includes an EGR cam nose 5a' formed on the intake cam shaft 5, a driving lever 10 pivotally supported by the intake rocker shaft 7a, an intermediate lever 11 pivotally supported by the exhaust rocker shaft 8a, and an EGR guide cam 6b' formed on the exhaust cam shaft 6.

The EGR cam nose 5a' on the intake cam shaft 5 side is formed between the two intake cam noses 5a and 5a of the intake cam shaft 5. The EGR cam nose 5a' includes an EGR base circular part 5b which is identical in diameter with the base circular part 5b on the intake side, and an EGR lift part 5c' which is smaller in lift amount than the lift part 5c on the intake side.

Moreover, the EGR guide cam 6b' on the exhaust cam shaft 6 side has a diameter which is identical with that of the base circular part 6b of the exhaust cam nose 6a. It is to be noted that the EGR guide cam 6b' consists of only a base circular part, and therefore has no lift part.

The driving lever 10 is formed into an almost "L" shape, and one of tip ends of the "L" shape is rockably supported by the rocker shaft 7a. Moreover, a roller 10a is supported at a corner of the "L" shape, and a pressing pin 10b is screwed to the other tip end of the "L" shape such that a position thereof in an axial direction can be adjusted.

The intermediate lever 11 is formed into an almost triangular shape, and an apical angle of the triangular shape is rockably supported by the rocker shaft 8a. Moreover, a pressing face 11a is formed on one of basic angles of the triangular shape such that the pressing pin 10b comes into contact therewith, and a roller 11b is pivotally supported at the other basic angle. The intermediate lever 11 is rotated and biased in a direction that the roller 11b is rolled constantly on the EGR guide cam 6b' of the exhaust cam shaft 6.

Herein, a switching mechanism 12 is formed between the intermediate lever 11 and the two exhaust rocker levers 8 and 8, and can switch between an EGR opening ON state where the rocking motion of the intermediate lever 11 is transmitted to the exhaust rocker levers 8 and 8 and an EGR opening OFF state where no rocking motion is transmitted.

Figure 5:
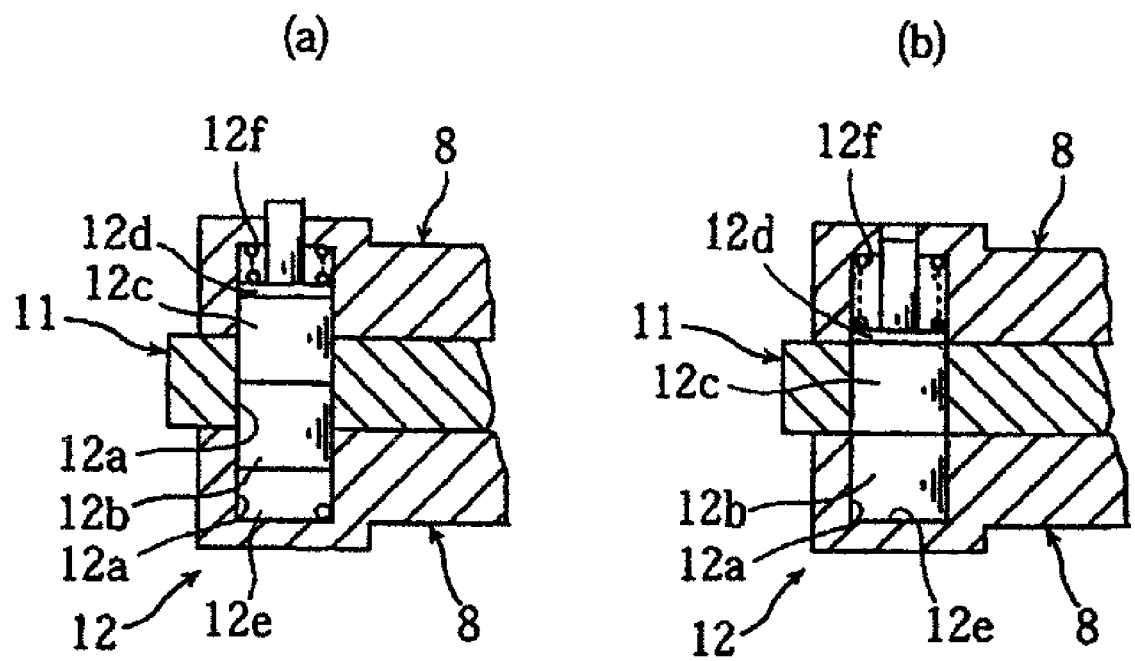
FIG. 5 shows an enlarged view of main parts of the valve mechanism.

As shown in FIG. 5, the switching mechanism 12 has the following structure. That is, a coupling hole 12a is formed so as to be coaxial with one of the basic angles of the intermediate lever 11 and one of the basic angles of each of the exhaust rocker levers 8 and 8, and coupling pistons 12b and 12c are arranged in the coupling hole 12a so as to be slidable in an axial direction and so as to be relatively moved in a direction perpendicular to the axial direction.

Moreover, one end face of the coupling piston 12b and one end of the coupling hole 12a form a hydraulic chamber 12e, and a return spring 12f is disposed between the other end face of the coupling piston 12c and the other end of the coupling hole 12a with a stopper 12d being interposed therebetween. To the hydraulic chamber 12e, an oil pressure can be supplied through a hydraulic passage 8d formed on the rocker shaft 8a.

When the oil pressure is supplied to the hydraulic chamber 12e, the coupling pistons 12c and 12b are located at a position ((a) of FIG. 5) straddling a boundary between the intermediate lever 11 and the exhaust rocker lever 8, so that the EGR opening ON state is established. Then, when the oil pressure is released, a contact between the coupling piston 12c and each of the coupling piston 12b and the stopper 12d is aligned with the boundary ((b) of FIG. 5), so that the EGR opening OFF state is established.

The intake cam shaft 5 also includes an intake cam phase variable mechanism 15 capable of freely controlling the phase of the intake cam shaft 5. When the phase of the intake cam shaft 5 is changed, an open/close timing of the intake valves IN1 and IN2 in the intake stroke is changed and, simultaneously, an open/close timing of the exhaust valves EX1 and EX2 in the EGR opening operation is also changed by the same phase. Moreover, the exhaust cam shaft 6 includes an exhaust cam phase variable mechanism 16 capable of freely controlling the phase of the exhaust cam shaft 6.

Figure 2:
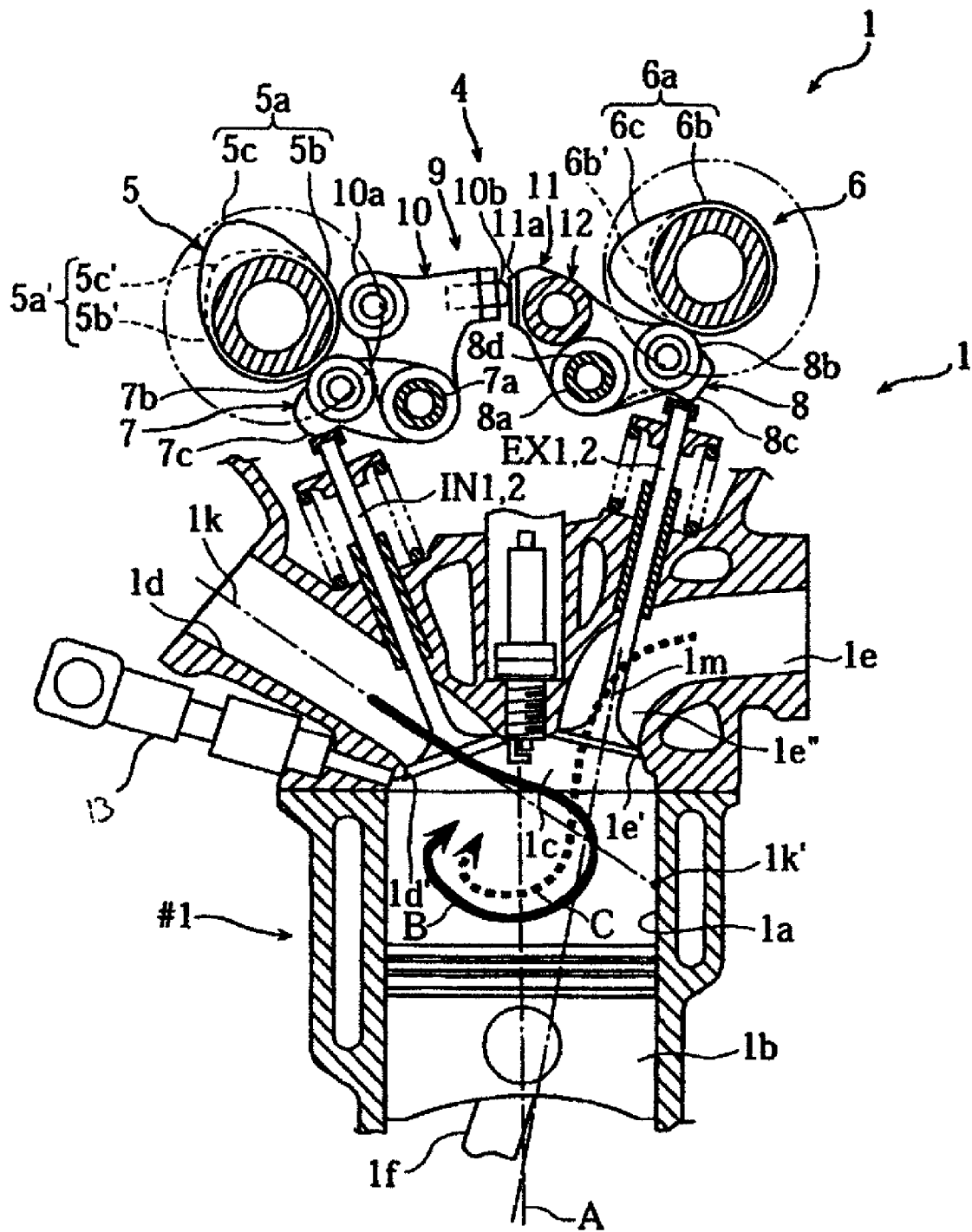
FIG. 2 shows a sectional side view of the engine according to the first embodiment.
Figure 4:
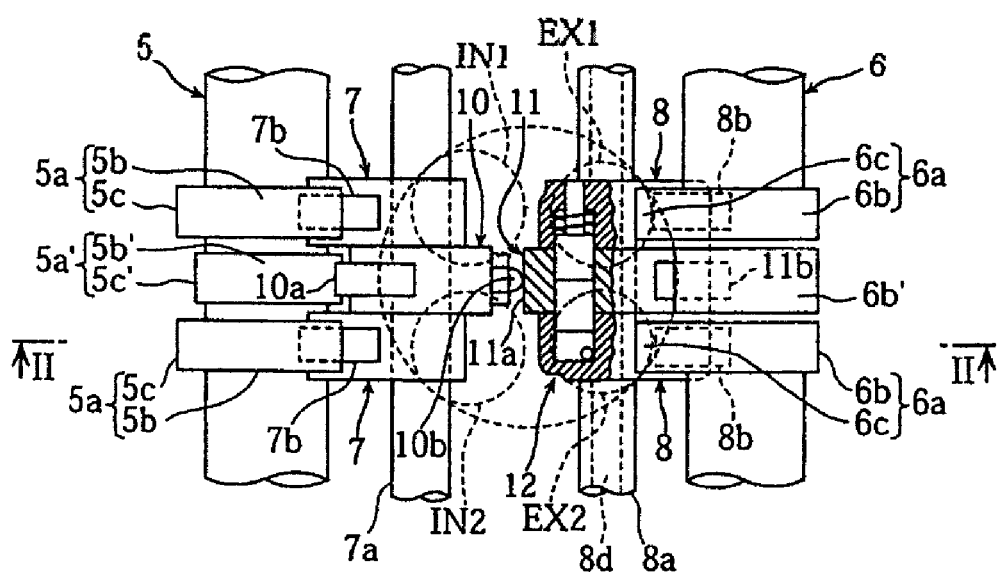
FIG. 4 shows a schematic plan view of a valve mechanism of the engine according to the first embodiment.

As shown by a bold solid line in FIG. 2, herein, the shape and the like of the intake port 1d are set such that an intake air flow (a fresh air flow) flows into the exhaust valve side beyond a cylinder unit axis A, flows down along the cylinder unit axis A and is inverted at a top face of the piston to generate a fresh air tumble flow B moving upward on the intake valve side. More specifically, the intake port 1d is formed into a substantially linear shape when being seen in a cam axis direction, and a center axis 1k thereof is directed to a portion 1k' of an inner circumferential face of the cylinder bore 1a close to the exhaust valve opening portion beyond the cylinder unit axis A. Thus, the fresh air flow is oriented to the exhaust valve side.

As shown by a bold broken line in FIG. 2, on the other hand, the shape and the like of the exhaust port 1e are set such that an exhaust gas backflow (an EGR gas flow) flows down along the cylinder unit axis A on the exhaust valve side and is inverted at the top face of the piston to generate an exhaust tumble flow C moving upward on the intake valve side. More specifically, an exhaust valve opening portion proximity portion 1e'' which is close to the exhaust valve opening portion 1e' of the exhaust port 1e is bent along the cylinder unit axis A. In other words, when being seen in the cam axis direction, the exhaust valve opening portion proximity portion 1e''' is bent to a degree that a center axis 1m thereof intersects the cylinder unit axis A at a position below the top face of the piston 1b at the bottom dead center.

As shown in FIG. 3, moreover, masking parts 1n and 1n are formed at left and right sides in the cam axis direction of a peripheral edge of the exhaust valve opening portion 1e'. The masking parts 1n and 1n prevent the EGR gas from flowing into the exhaust valve opening portion 1e' from the left and right sides in the cam axis direction, and allows most of the EGR gas to flow from a center in the cam axis direction.

In the engine 1 according to this embodiment, as described above, the fresh air tumble flow B and the exhaust gas (EGR gas) tumble flow C are generated and are turned in the single direction. Moreover, the exhaust gas tumble flow C is generated by the EGR gas flowing mainly from the center of each of exhaust valves EX1 and EX2. Therefore, temperature distribution in the cylinder bore around a compression stroke starting time becomes higher as approaching the center of the cylinder unit and becomes lower as approaching the left or right side in the cam axis direction (see (a) of FIG. 3). On the other hand, a fuel injection timing is divided into two, that is, a period near an overlap period during which an opening period of the intake valve overlaps with an EGR opening period of the exhaust valve or an initial stage of the intake stroke and the EGR opening period. Thus, the injected fuel is mixed with both the fresh air flow and the EGR gas flow, and can be distributed uniformly in the cylinder at a compression top dead center. As a result, a portion in the cylinder where the fuel is dense becomes high in temperature, leading to prevention of generation of NOx.

An intake device 3 connected to the engine 1 includes a surge tank 3e having a predetermined capacity, and branch pipes 3a to 3d branched off from the surge tank 3e and connected to the intake ports 1d of the cylinder units #1 to #4, respectively. A suction port 3f is formed at one end of the surge tank 3e, an intake throttling valve 3g is disposed on the suction port 3f, and an air cleaner (not shown) is connected to an upper stream side of the intake throttling valve 3g.

Furthermore, an exhaust device 2 connected to the engine 1 includes a first exhaust system 22 that couples between the cylinder unit #1 and the cylinder unit #4 each having the phase (the ignition interval) of 360° to discharge exhaust gas and a second exhaust system 23 that couples between the cylinder unit #2 and the cylinder unit #3 each having the phase of 360° to discharge exhaust gas, that is, the exhaust device 2 is a so-called 4-2-1 exhaust system. Herein, branch pipes 2a, 2d, 2b and 2c of the respective cylinder units are set to be relatively longer in length. In a high-load operating region, thus, the exhaust device 2 can avoid exhaust interference and, therefore, is suitable for improvement in output.

The first exhaust system 22 has the first branch pipe 2a connected to the exhaust port 1e of the cylinder unit #1, the fourth branch pipe 2d connected to the exhaust pipe 1e of the cylinder unit #4, and a first merging pipe 2e merging the branch pipes 2a and 2d with each other. The second exhaust system 23 has the second branch pipe 2b connected to the exhaust port 1e of the cylinder unit #2, the third branch pipe 2c connected to the exhaust port 1e of the cylinder unit #3, and a second merging pipe 2f merging the branch pipes 2b and 2c with each other. The first merging pipe 2e and the second merging pipe 2f are merged with a main pipe 2g.

Moreover, an upstream-side catalyst 2i is provided on the first merging pipe 2e and, also, an upstream-side catalyst 2i is provided on the second merging pipe 2f. Further, a downstream-side catalyst 2j is provided on the main pipe 2g. Furthermore, an exhaust throttling valve 2h for variably controlling an exhaust passage area is provided on an upstream side of the main pipe 2g with respect to the downstream-side catalyst 2j.

Next, detailed description will be given of supercharging of EGR gas between the cylinder unit #1 (corresponding to a first cylinder unit according to the present invention) and the cylinder unit #4 (corresponding to a second cylinder unit according to the present invention).

The engine 1 according to this embodiment is configured as follows. That is, a primary pressure wave by blowdown gas from the cylinder unit #4 arrives at the cylinder unit #1 at a predetermined timing by the EGR opening for reopening the exhaust valves EX1 and EX2 of the cylinder unit #1 around the bottom dead center of the intake stroke of the cylinder unit #1. Thus, the exhaust gas is flown back into the cylinder bore 1a, so that a pressure in the cylinder bore 1a is made higher than a pressure in the intake port 1d upon start of the compression stroke of the cylinder unit #1. It is to be noted that the branch pipes 2a, 2d, 2b and 2c of the respective cylinder units are set to be relatively longer in length; therefore, a large primary pressure wave can be generated by a large flow rate of exhaust gas by exhaust blowdown.

Figure 7:
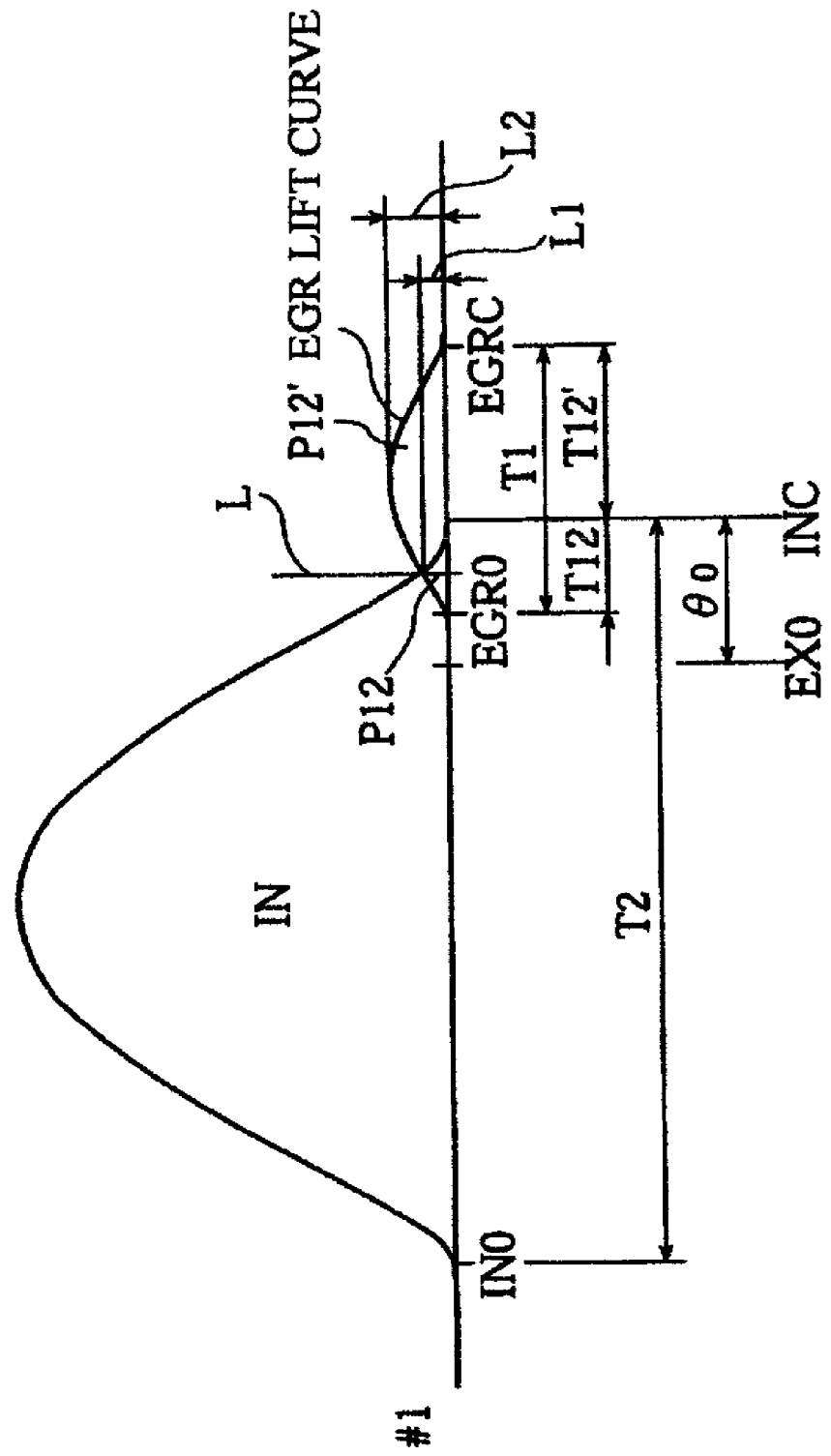
FIG. 7 shows an enlarged view of the valve timing.

As shown in FIG. 7, in other words, the engine 1 according to this embodiment is configured such that an average pressure P12 in the exhaust port 1e at an overlap period T12 during which a period T1 during which the exhaust valves EX1 and EX2 of the cylinder unit #1 are in the EGR opening state overlaps with a period T2 during which the intake valves IN1 and IN2 of the cylinder unit #1 are in the open state becomes lower than an average pressure P12' in the exhaust port 1e at a period T12' within the EGR opening period T1 and after a lapse of the overlap period T12.

In order to set the average pressure P12 to be lower than the average pressure P12', this embodiment adopts the following structure. In the middle-load operating region, for example, a total length of the first branch pipe 2a and the fourth branch pipe 2d each including the exhaust port 1e in the first exhaust system 22, the EGR opening period T1, and an exhaust valve open timing EXO in an expansion stroke of the cylinder unit #4 are set such that most of the primary pressure wave by the exhaust blowdown from the cylinder unit #4 arrives at the exhaust valve opening portion 1e' of the cylinder unit #1 at the period T12' within the EGR opening period T1 and after the lapse of the overlap period T12.

That is, the total length of the first branch pipe 2a and the fourth branch pipe 2d each including the exhaust port 1e in the first exhaust system 22 and the total length of the second branch pipe 2b and the third branch pipe 2c each including the exhaust port 1e in the second exhaust system 23 are set at a length that most of the primary pressure wave by the blowdown gas from one of the cylinder units arrives at the exhaust valve opening portion of the other cylinder unit at the period T12' after the lapse of the overlap period T12.

More specifically, the total length of the first branch pipe 2a and the fourth branch pipe 2d is set at a length (e.g., 0.8 m) that the primary pressure wave (velocity: 500 m/s) from the cylinder unit #4 arrives at the cylinder unit #1 at a time (e.g., 1.7 msec) corresponding to a crank angle θo (e.g., 20°) from the exhaust valve open timing EXO (BBDC of 15°-invalid angle of 15°) to the overlap period elapsed time INC (ABDC of 15°-invalid angle of 15°) at a predetermined engine rotation speed (e.g., 2000 rpm). On the other hand, at a rotation speed (e.g., 1000 rpm) lower than the predetermined rotation speed, an invalid angle of a valve opening degree is reduced (e.g., 10°) and a pressure propagation crank angle is reduced (e.g., 10°). Therefore, the exhaust valve must be retarded (e.g., reduced amount of invalid angle: 5×2 [θo=30°]+reduced amount of propagation angle: 10°=20°). In contrast, at a high rotation speed, the exhaust valve must be advanced.

Figure 19:
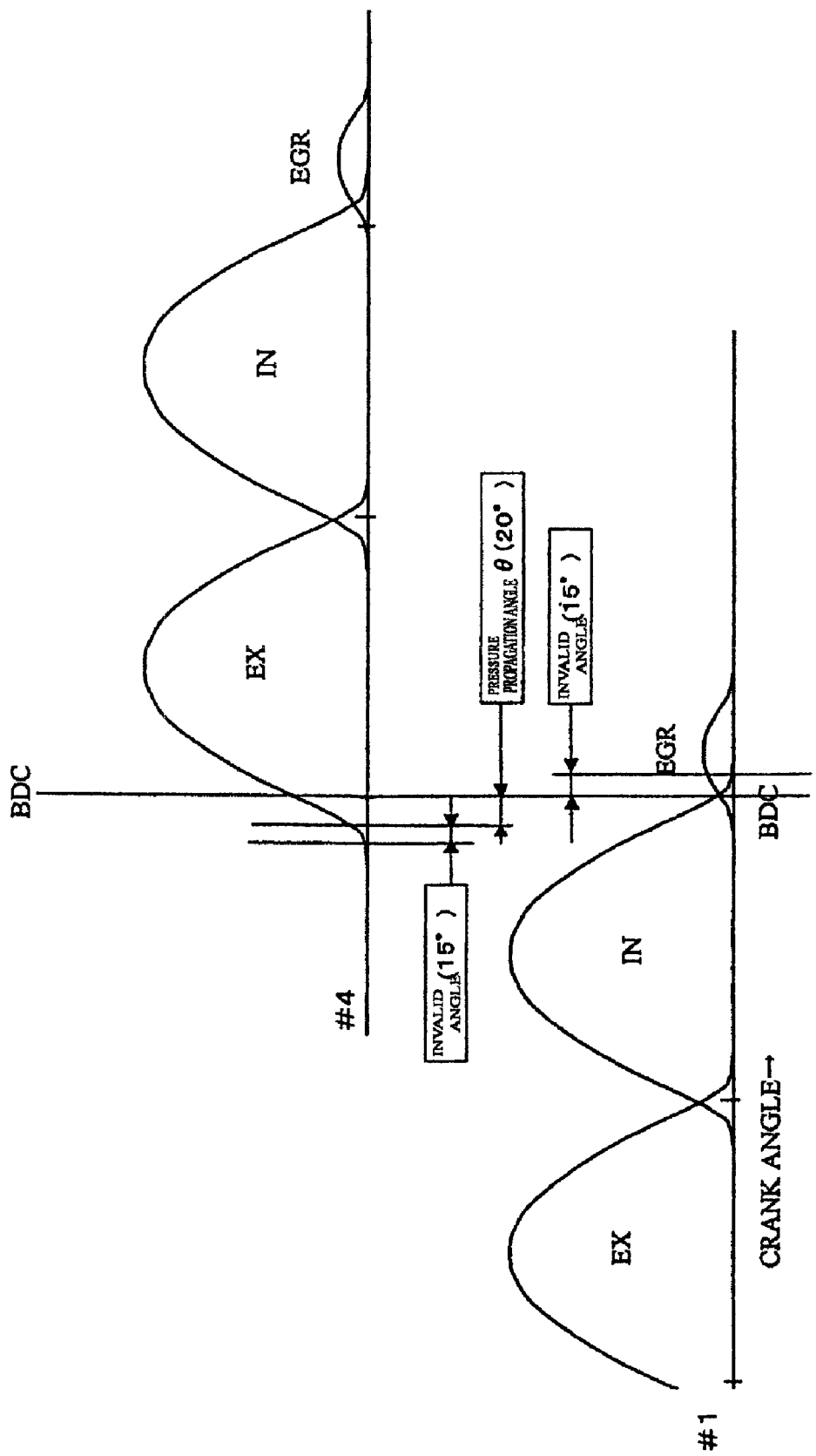
FIG. 19 shows an invalid crank angle in valve lift.

As shown in FIG. 19, herein, the invalid angle refers to an angle that in a case where a valve is opened and closed, even when the valve is lifted, a flow rate to be obtained is small in value because a gap is small. In this example, in a case where the exhaust valve is opened and the intake valve is closed, a flow rate of the exhaust gas and a flow rate of the fresh air become almost zero at 2000 rpm within a range of a crank angle of 15°.

Figure 6:
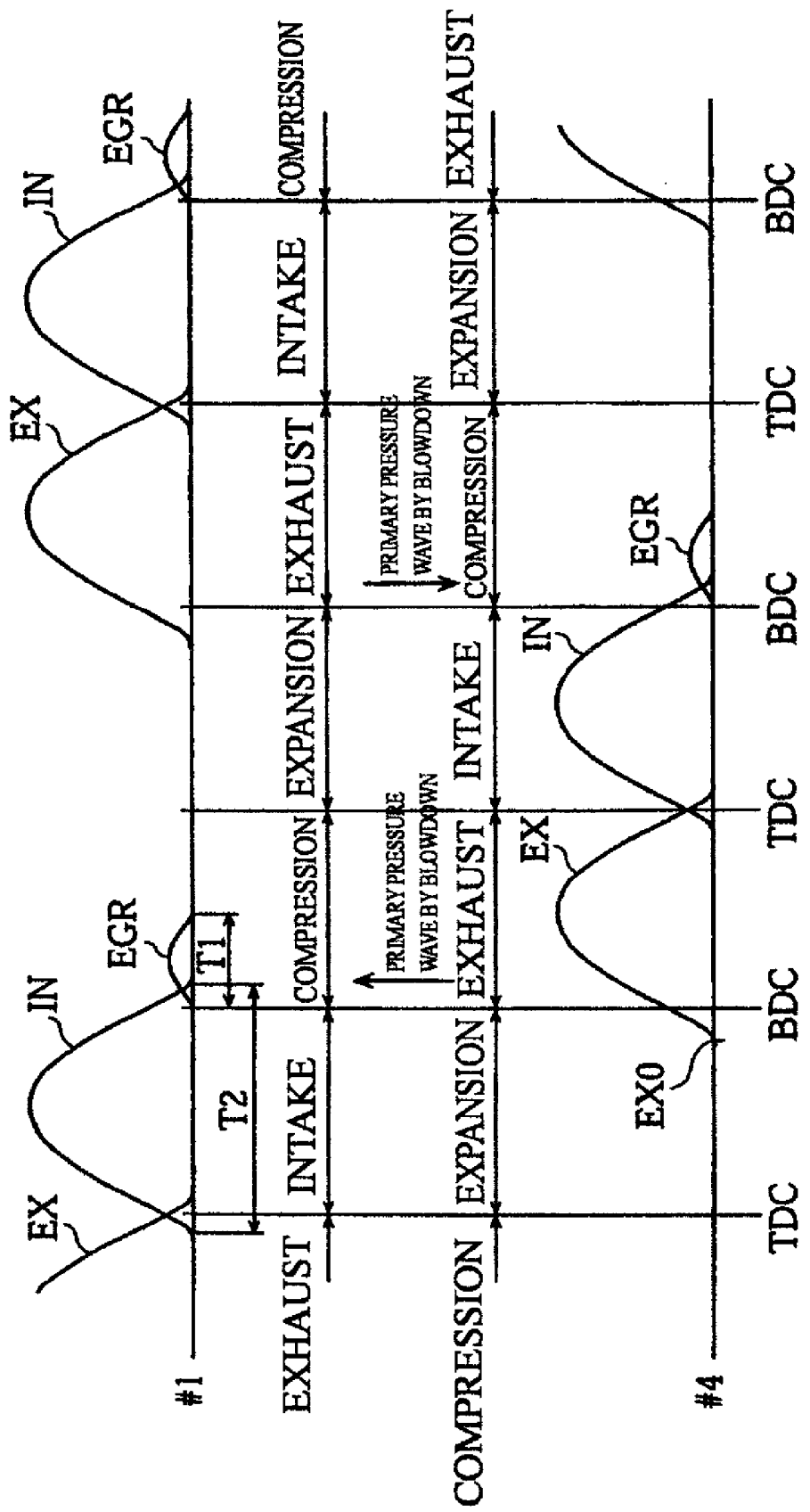
FIG. 6 shows a valve timing of the engine according to the first embodiment.

In the cylinder unit #1 and the cylinder unit #4 of the engine 1 according to this embodiment, when the intake cam shaft 5 and the exhaust cam shaft 6 are rotated, the intake valve IN and the exhaust valve EX are opened/closed in accordance with lift curves shown in FIG. 6.

In an operating region where an EGR opening operation is performed, an oil pressure is supplied to the hydraulic chamber 12e of the switching mechanism 12, so that coupling pistons 12b and 12c move to positions shown in (a) of FIG. 5. Thus, the EGR cam nose 5a' of the intake cam shaft 5 opens/closes the exhaust valves EX1 and EX2. Specifically, when the lift part 5c' of the EGR cam nose 5a' rocks the driving lever 10 through the roller 10a, this rocking motion is transmitted to the intermediate lever 11 through the pressing pin 10b, so that the exhaust rocker lever 8 rocks together with the intermediate lever 11. Thus, the exhaust valves EX1 and EX2 are opened/closed along EGR lift curves shown in FIGS. 6 and 7.

In an operating region where no EGR opening operation is performed, the supply of the oil pressure is stopped and the coupling pin 12b moves to a position shown in (b) of FIG. 5, so that the rocking motion of the intermediate lever 11 is not transmitted to the exhaust rocker lever 8. Accordingly, the exhaust valve performs no EGR opening operation. In this embodiment, the engine 1 is not operated constantly in a high-rotation region. Therefore, valve acceleration by an EGR cam can be set to be high. In the EGR cam, relatively high lift is set although an opening degree is narrow, so that a large amount of EGR gas can be fed in a short time.

Figure 9:
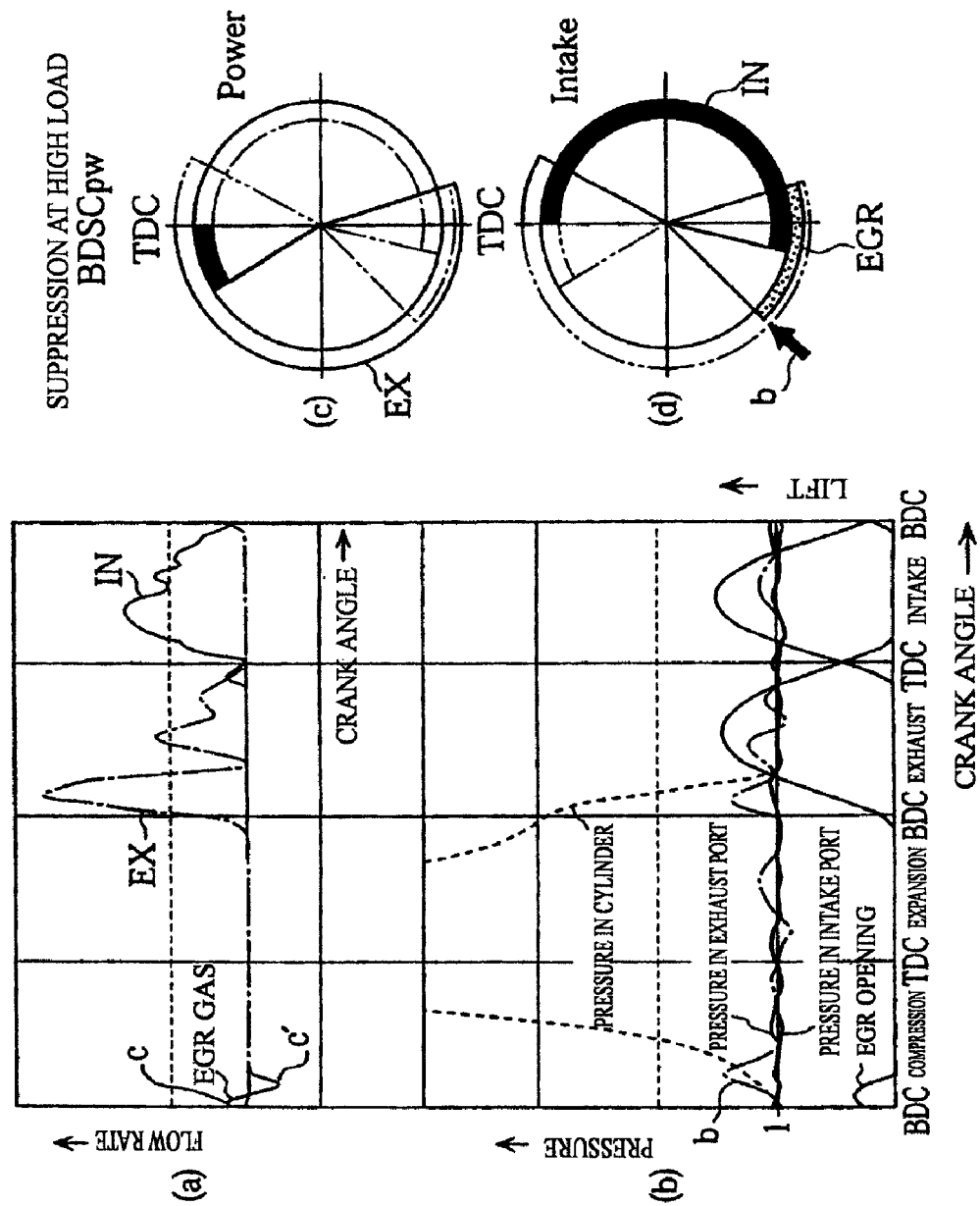
FIG. 9 shows characteristics of the engine according to the first embodiment.
Figure 10:
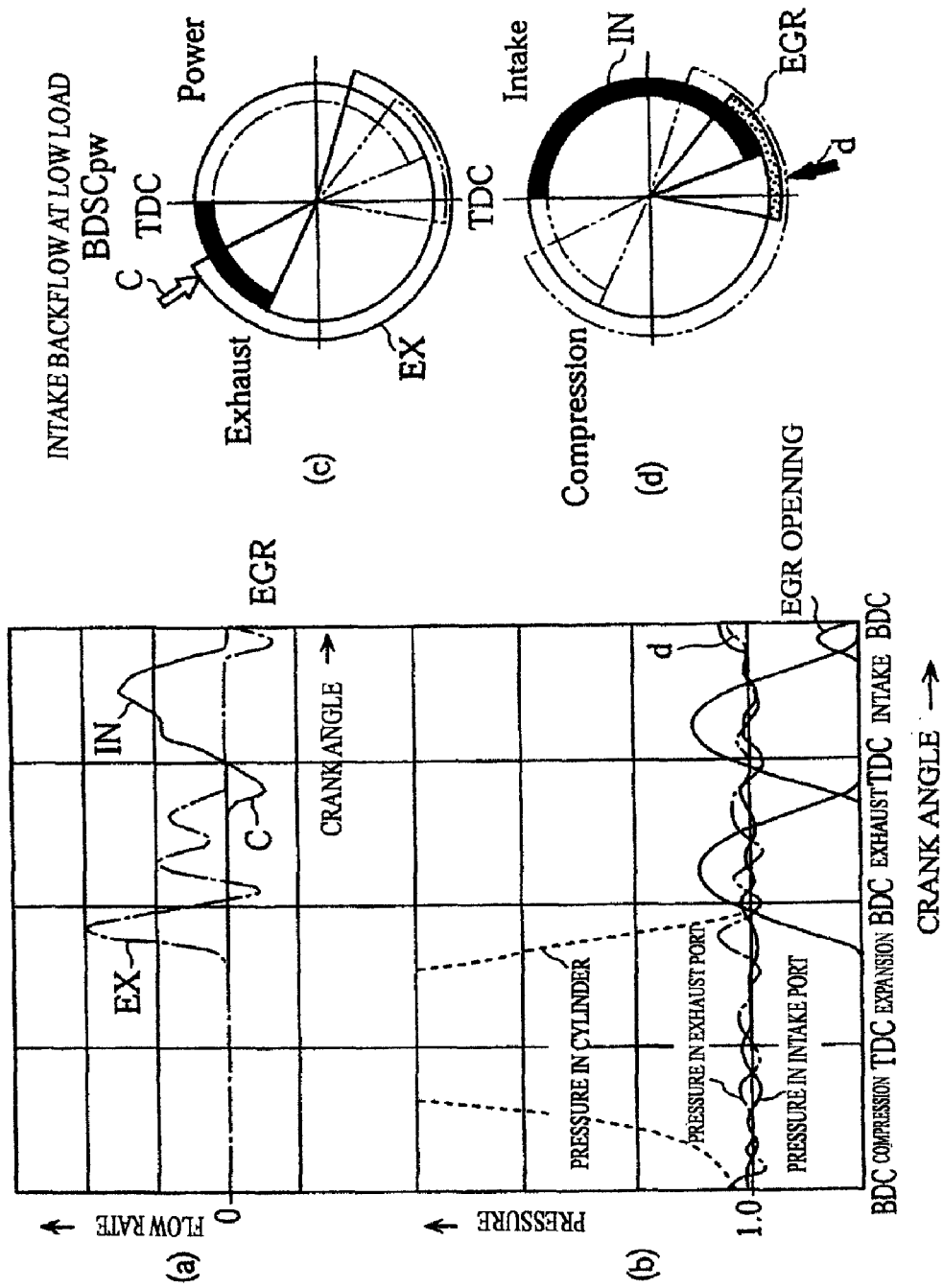
FIG. 10 shows characteristics of the engine according to the first embodiment.

In the low-load operating region, the engine 1 according to this embodiment is operated in an "intake backflow EGR+exhaust reintake+EGR gas supercharge"/HCCI mode (see FIG. 10). Herein, the intake valve is opened early to flow the exhaust gas back into the intake port. In the middle-load operating region, the engine 1 is operated in a "full blowdown pressure wave supercharge"/HCCI mode (see FIG. 8) in which an EGR gas supercharging effect is large. In the high-load operating region, the engine 1 is operated in an "EGR gas supercharge with suppressed blowdown pressure wave supercharging effect"/HCCI mode (see FIG. 9).

Figure 8:
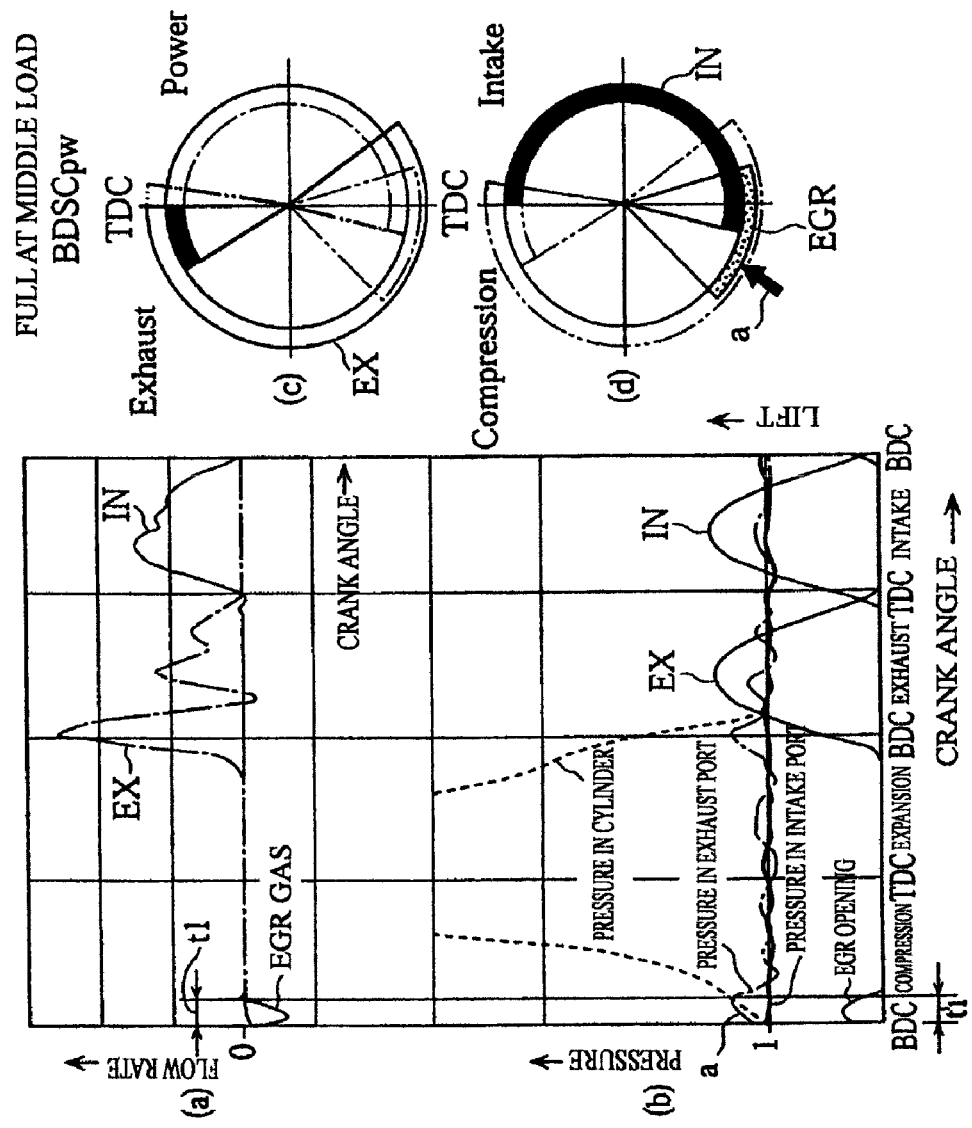
FIG. 8 shows characteristics of the engine according to the first embodiment.

In the "full blowdown pressure wave supercharge"/HCCI mode (FIG. 8) in the middle-load operating region, the exhaust valves EX1 and EX2 of the respective cylinder units are opened from a terminal period of the expansion stroke to a point in time at which the top dead center of the intake stroke has exceeded slightly (see (c) of FIG. 8) while the intake valves IN1 and IN2 are opened from a terminal period of the exhaust stroke to a point in time at which the bottom dead center of the intake stroke has exceeded slightly. When the EGR opening operation is performed, the exhaust valves EX1 and EX2 of the cylinder unit #1 are reopened from a point in time slightly before the bottom dead center of the intake stroke to an initial period of the compression stroke (see (d) of FIG. 8). In this case, the exhaust valve of the cylinder unit #1 performs the EGR opening operation and, simultaneously, the primary pressure wave by the blowdown gas generated when the exhaust valves EX1 and EX2 of the cylinder unit #4 are opened arrives at the exhaust port of the cylinder unit #1 (see arrow mark a shown in (d) of FIG. 8).

In FIG. 8, (a) shows characteristics that a flow rate of the EGR gas, a flow rate of the exhaust gas and a flow rate of the fresh air are changed in accordance with a crank angle, and (b) shows characteristics that a pressure in the cylinder, a pressure in the exhaust port and a pressure in the intake port are changed in accordance with the crank angle.

At a compression stroke start time t1, a primary pressure wave a by blowdown arrives at the exhaust port. Herein, the EGR opening operation is performed; therefore, the EGR gas flows in a direction (minus side) opposite to the flow of the exhaust gas. It is understood from the fact described above that the pressure in the cylinder is higher than the pressure in the intake port.

In this embodiment, as described above, most of the primary pressure wave by the blowdown arrives at the exhaust valve opening portion 1e' at the period T12' within the EGR opening period T1 and after the lapse of the overlap period T12 in the middle-load operating region. At the overlap period, therefore, the primary pressure wave hardly arrives at the exhaust valve opening portion and the pressure in the exhaust port is low. Accordingly, the EGR gas hardly pushes out the fresh air aspirated in the cylinder. On the other hand, most of the primary pressure wave arrives after the lapse of the overlap period; therefore, the pressure in the exhaust port becomes high. In addition, the degree of the EGR opening is sufficiently large at this period. Accordingly, a large amount of EGR gas is fed into the cylinder. At this time, of course, the fresh air is not pushed out because the intake valve is closed. At this timing, further, the piston is around the bottom dead center or in the compression stroke; therefore, the capacity of the cylinder is not changed or is reduced. As a result, the pressure in the cylinder can be increased effectively in such a manner that the EGR gas is pushed into the cylinder. It is to be noted that when the pressure in the exhaust port is decreased during the EGR opening period, the gas in the cylinder flows into the exhaust port. In order to avoid this disadvantage, it is desirable that the pressure wave becomes maximum at a timing immediately before the EGR opening.

In the "EGR gas supercharge with suppressed blowdown pressure wave supercharging effect"/HCCI mode (FIG. 9) in the high-load operating region, the phase of the exhaust cam shaft 6 is retarded by the exhaust cam phase variable mechanism 16 such that the exhaust valves EX1 and EX2 are opened at a timing slightly before the bottom dead center of the expansion stroke, for example, at a timing which is substantially coincide with the timing that the exhaust valves EX1 and EX2 are opened in the EGR opening operation.

Then, most of the primary pressure wave by the exhaust blowdown from the cylinder unit #4 arrives at the exhaust valve opening portion 1e of the cylinder unit #1 around a timing that the EGR opening period T1 elapses (see arrow mark b shown in FIG. 9), that is, at a timing that the degree of the EGR opening becomes small. As a result, the blowdown pressure wave supercharging effect is suppressed and the compression temperature is reduced. Therefore, the ignition timing is not advanced excessively even when a supply amount of fuel is increased, and output can be increased.

Moreover, the pressure in the exhaust port immediately before the pressure wave arrives is relatively low. On an operating condition that a positive pressure wave arrives at the intake port, therefore, the fresh air is supplied to the exhaust port via the cylinder bore at the overlap period during which the opening state of the intake valve and the EGR opening state of the exhaust valve overlap with each other (see point c shown in FIG. 9), and is aspirated again at the time when the pressure wave described above arrives. Thus, the aspiration amount of fresh air can be further increased.

In FIG. 9, (a) shows characteristics of a flow rate of the EGR gas, a flow rate of the exhaust gas and a flow rate of the fresh air, and (b) shows characteristics of a pressure in the cylinder, a pressure in the exhaust port and a pressure in the intake port. With regard to the flow rate of the EGR gas, a positive side (point c) indicates that the EGR gas in the cylinder bore flows toward the exhaust port side while a negative side (point c') indicates that the EGR gas flows from the exhaust port into the cylinder bore.

Since the phase of the exhaust cam shaft 6 is retarded as described above, the primary pressure wave b by the blowdown in the exhaust valve opening operation arrives with delay relative to the EGR opening operation. In addition, the capacity of the cylinder is gradually reduced in the compression stroke. It is therefore understood that the feed amount of EGR gas becomes small.

On the other hand, when the phase of the exhaust cam is retarded, the close timing of the exhaust valve is also retarded, so that overlap between the intake valve and the exhaust valve is widened. However, by the effect of the 4-2-1 exhaust system, the pressure in the exhaust port around the exhaust top dead center is kept to be low (see FIG. 9); therefore, it can be expected that the amount of fresh air is increased by improvement in scavenging effect at the overlap period.

In the "intake backflow EGR+exhaust reintake+EGR gas supercharge"/HCCI mode (FIG. 10) in the low-load operating region, moreover, the phase of the intake cam shaft 5 and the phase of the exhaust cam shaft 6 are advanced by the intake cam phase variable mechanism 15 and the exhaust cam variable mechanism 16, respectively, as compared with the phases (e.g., about 30° to 40°) in the middle-load operating region. In this case, it is needless to say that the EGR cam nose 5a' is also advanced together with the intake cam shaft 5.

In FIG. 10, (a) shows characteristics of a flow rate of the EGR gas, a flow rate of the exhaust gas and a flow rate of the fresh air, and (b) shows characteristics of a pressure in the cylinder, a pressure in the exhaust port and a pressure in the intake port.

In the low-load operating region, both the intake cam shaft 5 and the exhaust cam shaft 6 are advanced as described above. Therefore, the backflow of the exhaust gas to the intake port occurs at the latter period of the exhaust stroke (see a symbol C shown in (a) of FIG. 10, and arrow mark C shown in (c) of FIG. 10), and the amount of EGR gas is increased. In a lower-load operating region, the intake throttling valve is throttled. Thus, the pressure in the intake port becomes negative and the amount of fresh air in the intake port is reduced. Further, backflow of the larger amount of exhaust gas to the intake port occurs at the latter period of the exhaust stroke, so that the amount of EGR gas is further increased.

In the low-load operating region, although the primary pressure wave becomes small in amplitude, the EGR opening operation and the phase relation of the exhaust valve or the like are held as in the case of the middle-load operating region. Therefore, the EGR gas supercharging effect is obtained although it is weak (see symbol d shown in (b) of FIG. 10, and arrow mark d shown in (d) of FIG. 10). Moreover, the increase of the compression pressure contributes to ensured combustion stability. In this case, when the pressure in the exhaust port is reduced during the EGR opening period, the gas in the cylinder flows into the exhaust port. In order to avoid this disadvantage, it is desirable that the pressure wave becomes maximum at a timing immediately before the EGR opening.

The engine according to this embodiment must be switched to the spark ignition combustion at the high load and the extremely low load. The switch to the spark ignition combustion is performed in such a manner that the supply of the pressure oil to the switching mechanism 12 for the EGR opening is stopped in synchronization with the close timing of the EGR opening of the cylinder unit #1. With this configuration, the coupling piston is disengaged at the time when the exhaust valve lift in each cylinder unit becomes zero, so that the EGR opening is stopped in the subsequent cycle. Thus, the amount of EGR gas is reduced; therefore, the spark ignition combustion becomes possible in synchronization with the cycle. However, since the close timing of the intake valve and the control of the throttle valve are delayed, an air/fuel ratio is leaned in several cycles; therefore, the stability can be ensured by the spark ignition stratified lean combustion based on gasoline compression stroke injection. In contrast, in a case where the engine is switched to the HCCI combustion, such switch can be stably performed in such a manner that the spark ignition stratified lean combustion is performed immediately before the switch.

Figure 11:
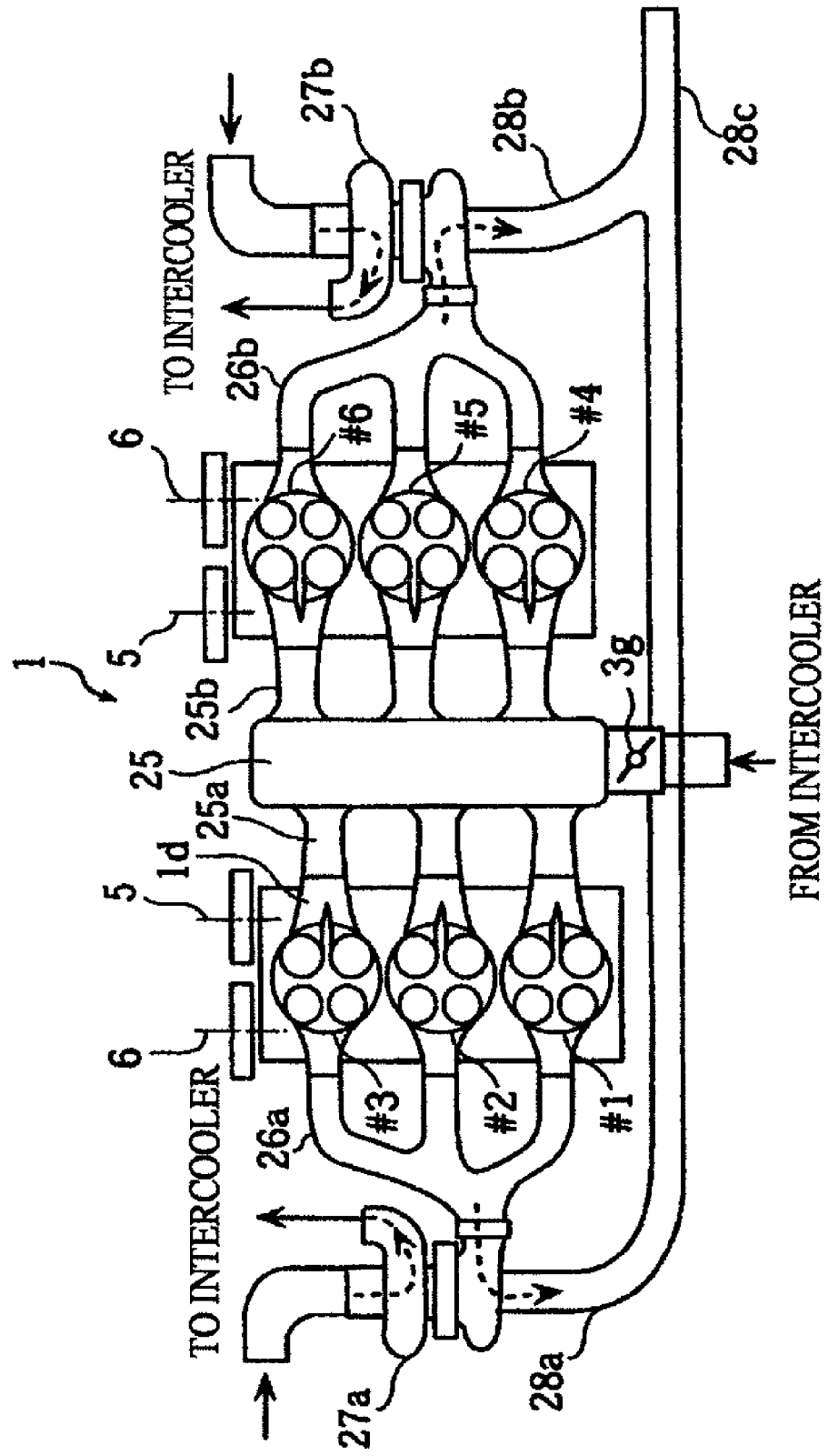
FIG. 11 shows a schematic configuration of an engine according to a second embodiment of the present invention.

FIG. 11 shows a second embodiment of the present invention. In FIG. 11, reference symbols identical with those in FIG. 1 denote components identical with or corresponding to those in FIG. 1.

In the first embodiment, the EGR gas is supercharged by the primary pressure wave by the blowdown from the second cylinder unit. In the second embodiment, on the other hand, EGR gas is supercharged through use of an advantage that an exhaust pressure (a back pressure) is higher than an intake pressure in an exhaust system.

As shown in FIG. 11, an engine 1 according to this embodiment is an HCCI engine based on an intercooler turbo charging 4-valve DOHC turbocharger diesel engine. In order to widen an HCCI operating region, a compression ratio is set at, for example, 14.5 which is lower than that of a conventional diesel engine. Moreover, an engine according to a third embodiment and an engine according to a fourth embodiment are based on an intercooler turbocharging 4-valve DOHC V8 engine and an intercooler turbocharging 4-valve DOHC I4 engine, respectively, as will be described later.

In the engine 1, cylinder units #1 to #3 are arranged so as to form a left bank while cylinder units #4 to #6 are arranged so as to form a right bank. A surge tank 25 arranged between the left bank and the right bank is connected to an intake port 1d of each of the cylinder units #1 to #3 through an intake manifold 25a and, also, is connected to an intake port 1d of each of the cylinder units #4 to #6 through an intake manifold 25b. Moreover, a left turbocharger 27a having a variable nozzle-type turbine is connected to each cylinder unit in the left bank through a left exhaust manifold 26a while a right turbocharger 27b having a variable nozzle-type turbine is connected to each cylinder unit in the right bank through a right exhaust manifold 26b. Exhaust gas outlet pipes 28a and 28b are connected to the turbochargers, respectively, and are merged with a merging pipe 28c. It is to be noted that air is pressurized at the turbochargers 27a and 27b and, then, is supplied to each cylinder through an intercooler (not shown) and the surge tank 25.

In the V-type engine such as the engine 1 according to this embodiment, the cylinder unit of the left bank is different in phase from the cylinder unit of the right bank by 360°. In the engine 1 in which the left bank is different in exhaust system from the right bank, therefore, no primary pressure wave by large blowdown arrives around an intake bottom dead center. In a case of no exhaust throttling, an exhaust port pressure at an EGR opening period is kept to be low.

In the turbochargers 27a and 27b according to this embodiment, the exhaust pressure becomes automatically higher than the intake pressure because a rotation speed of the turbine is low in an excessive operation such as start of acceleration. When the variable nozzle is controlled in a close direction during this acceleration, the exhaust pressure becomes more higher. When the rotation speed of the turbine is increased to approach a stationary state, the intake pressure is increased and the variable nozzle is controlled in an open direction. Therefore, the feed amount of EGR gas is reduced, and output is readily increased. At starting or idling, the variable nozzle is throttled to a substantially full close position, and is used as an exhaust throttling valve.

In the engine 1 according to this embodiment, an exhaust cam shaft is provided with an EGR cam for opening an exhaust valve around a bottom dead center of an intake stroke. This EGR cam is configured to make an overlap between an open period of the intake valve and an EGR opening period of the exhaust valve small. As shown in FIG. 7, for example, a center portion of an overlap between a lift curve of the EGR cam and a lift curve of the intake valve or a lift amount L1 of the EGR cam at a point L where the lift curves intersect becomes about 40% of a maximum lift amount L2 of the EGR cam.

In the second embodiment, the center of the overlap period or the lift amount at the point where the lift curves intersect becomes about 40% of the maximum lift amount in the EGR opening operation; therefore, the overlap period becomes short. Accordingly, a period after a lapse of the overlap period becomes long. As a result, the amount of fresh air to be pushed out is reduced while the amount of EGR gas to be pushed into is increased.

As another method of reducing the amount of fresh air to be pushed out, the following configuration may be adopted.

The intake valve of the first cylinder unit is closed after the bottom dead center and the exhaust valve of the first cylinder unit is opened before closing the intake valve of the first cylinder in the EGR opening operation to achieve maximum lift after closing the intake valve.

The lift in the EGR opening becomes maximum after closing the intake valve; therefore, an overlapped opening time area of the overlap period becomes narrow and an opening time area after a lapse of the overlap period becomes wide. Accordingly, the amount of fresh air to be pushed out is reduced while the amount of EGR gas to be pushed into is increased in correspondence with the fact described above. That is, the intake valve is closed after the intake bottom dead center and, then, the lift of the EGR opening becomes maximum. Therefore, the fresh air can be aspirated through full use of the intake stroke. Further, the EGR gas can be fed effectively without pushing the aspirated fresh air back into the intake port.

In a case where the exhaust is not throttled or in a state that a turbo rotation speed is in a stationary state and an intake pressure increases, the maximum lift of the EGR opening is in a compression stroke and a capacity of the cylinder is reduced. Therefore, the EGR gas is hardly fed, and the amount of EGR gas is prevented from being increased excessively. In order to prevent increase in amount of the EGR gas with certainty, an EGR opening ON/OFF mechanism may be provided.

Figure 12:
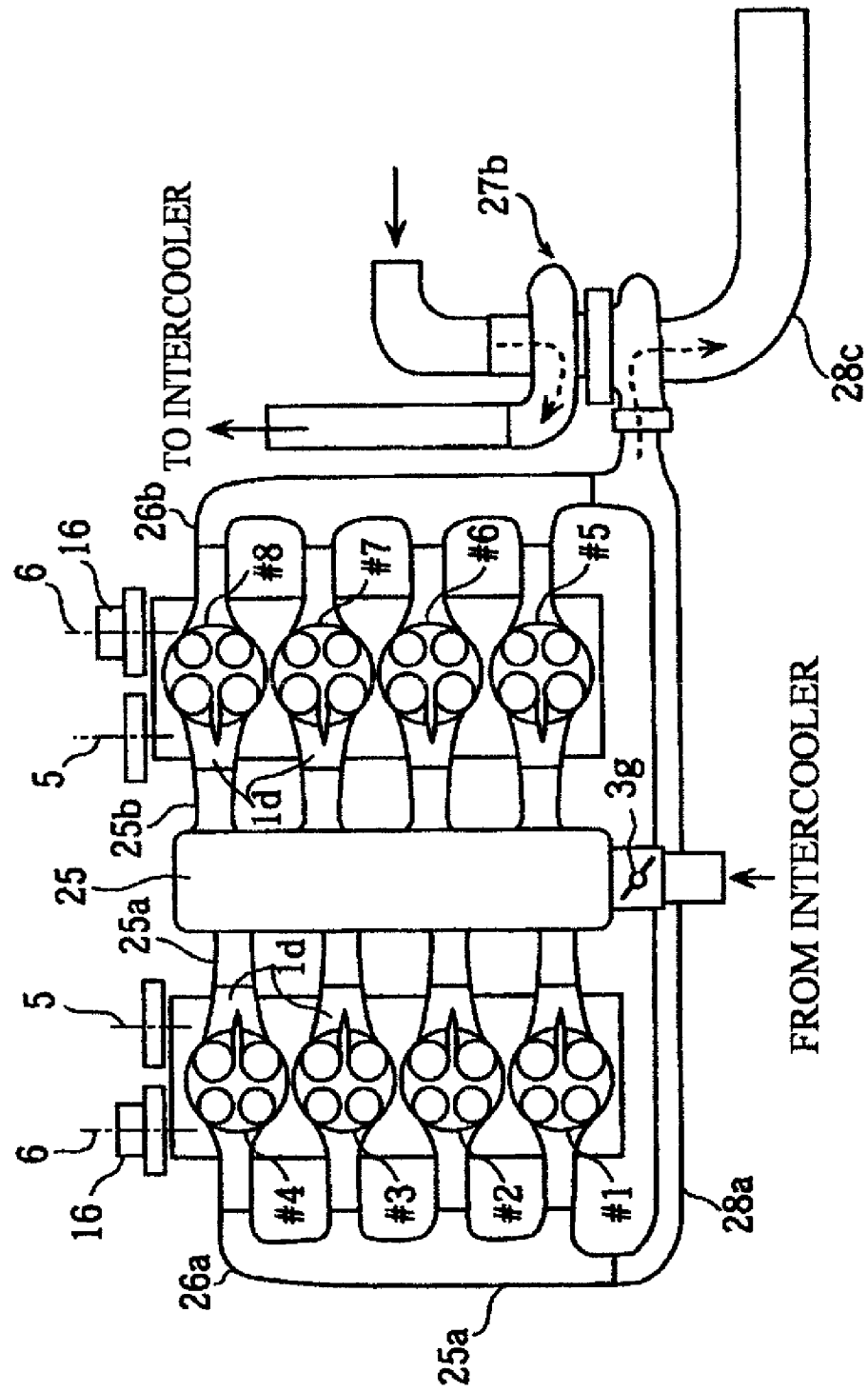
FIG. 12 shows a schematic configuration of an engine according to a third embodiment of the present invention.
Figure 13:
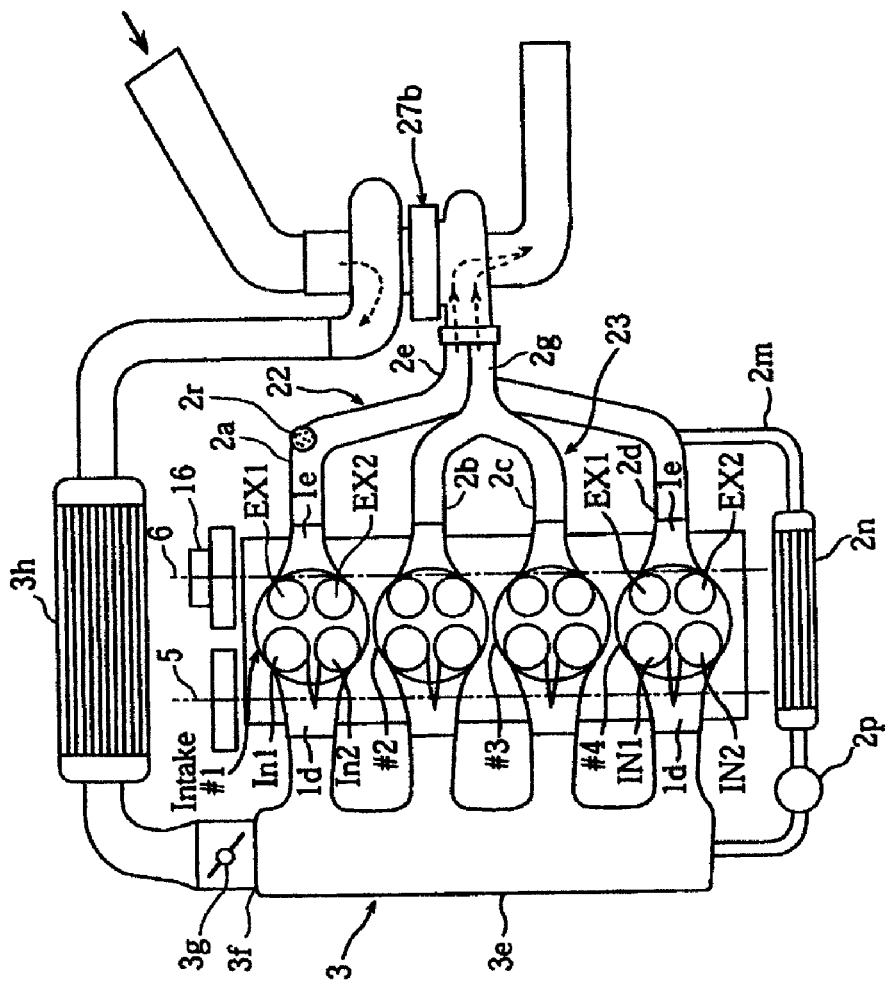
FIG. 13 shows a schematic configuration of an engine according to a fourth embodiment of the present invention.
Figure 14:
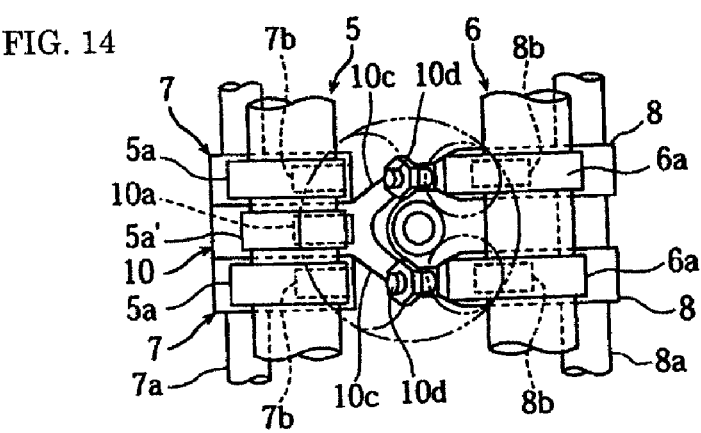
FIG. 14 shows a schematic plan view of a valve mechanism of the engine according to the fourth embodiment.
Figure 15:
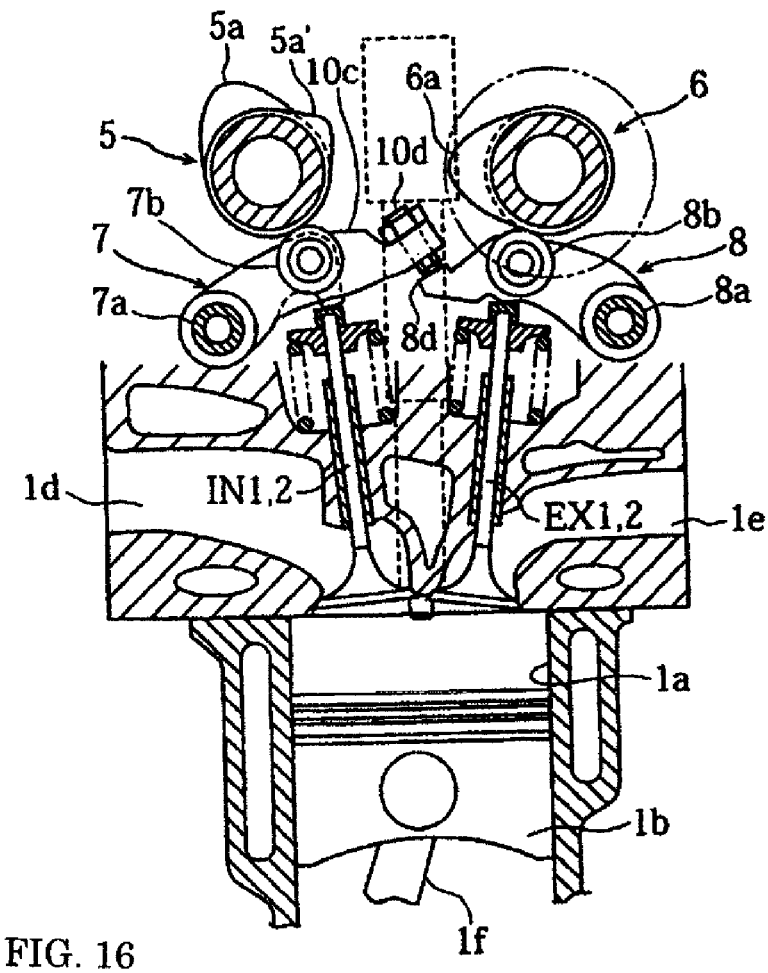
FIG. 15 shows a sectional side view of the valve mechanism.

FIG. 12 shows an entire configuration of a third embodiment of the present invention. In FIG. 12, reference symbols identical with those in FIG. 11 denote components identical with or corresponding to those in FIG. 11.

In the second embodiment, the turbochargers are provided for the left and right banks, respectively. In the third embodiment, on the other hand, a common turbocharger 27*b* is provided for left and right banks.

In the engine 1 according to the third embodiment, cylinder units #1 to #4 are arranged to form the left bank while cylinder units #5 to #8 are arranged to form the right bank. A surge tank 25 is provided between the left bank and the right bank. The surge tank 25 is connected to an intake port 1*d* of each cylinder unit of the left bank through an intake manifold 25*a* and, also, is connected to an intake port 1*d* of each cylinder unit of the right bank through an intake manifold 25*b*. A left exhaust manifold 26*a* is connected to each cylinder unit of the left bank while a right exhaust manifold 26*b* is connected to each cylinder unit of the right bank. A left exhaust pipe connected to the left manifold 26*a* and a right exhaust pipe connected to the right manifold 26*b* are merged with each other, and the turbocharger 27*b* having a variable nozzle-type turbine is connected to a merged portion of the left and right exhaust pipes.

In the V-type engine such as the engine 1 according to this embodiment, the cylinder unit of the left bank is different in phase from the cylinder unit of the right bank by 360°. Therefore, a length of the exhaust pipe used for connection between the cylinder unit of the left bank and the cylinder unit of the right bank becomes long. When an open timing of the exhaust valve is retarded slightly as compared with a normal condition, a primary pressure wave by blowdown arrives after a bottom dead center of an intake stroke. Moreover, since the primary pressure arrival timing varies largely due to a rotation speed, the open timing of the exhaust valve is frequently adjusted for each rotation speed.

Moreover, when the cylinder units which are different in phase from each other by 360° are used in combination, the exhaust pipe to be used for connection between the cylinder units largely varies in length in some instances. Therefore, it is desirable that a retardation amount of a cylinder unit group requiring a short exhaust pipe is set to be slightly larger. Herein, an influence of the exhaust valve open timing to be exerted on another performance is small; therefore, the unbalanced length between the cylinder units causes no problems at the exhaust valve open timing.

FIGS. 13 to 16 show a fourth embodiment of the present invention. In FIGS. 13 to 16, reference symbols identical with those in FIGS. 1 to 5 denote components identical with or corresponding to those in FIGS. 1 to 5.

In an engine 1 according to the fourth embodiment, a merging pipe 2*e* of a first exhaust system 22 and a merging pipe 2*g* of a second exhaust system 23 are connected to a turbocharger 27*b* having a common variable nozzle turbine. An intercooler 3*h* is interposed between an air outlet of the turbocharger 27*b* and a surge tank 3*e*. Moreover, a pressure sensor 2R is provided on an exhaust branch pipe 2*a*.

An exhaust branch pipe 2*d* and the surge tank 3*e* are connected to each other through an EGR passage 2*m*, and an EGR cooler 2*n* and an EGR valve 2*p* are provided on the EGR passage 2*m*. When the EGR valve 2*p* is opened, exhaust gas is cooled by the EGR cooler 2*n* and, then, is fed into the surge tank 3*e*. Thereafter, the exhaust gas is aspirated into an intake side of each cylinder unit.

With regard to EGR gas supercharging, an amount of EGR gas which can be fed without reducing an amount of fresh air is limited. In a low-load operation requiring a higher EGR rate, therefore, the amount of EGR gas must be increased by another method used in combination. If a method of reducing the amount of fresh air and, then, feeding a large amount of high-temperature internal EGR gas is applied to the engine according to the fourth embodiment, which uses gas oil as fuel and has a high compression ratio, without changes as in the first embodiment, a compression temperature increases excessively. In order to avoid this disadvantage, the EGR cooler 2*n* is provided to feed external cooled EGR gas.

In a valve system of the engine 1 according to the fourth embodiment, moreover, a driving lever 10 for performing an EGR opening operation is pivotally supported by an intake rocker shaft 7*a*, and an EGR cam nose 5*a*' formed on an intake cam shaft 5 rocks the driving lever 10 vertically through a roller 10*a*. The driving lever 10 has fork pressing pieces 10*c* and 10*c*. Pressing pins 10*d* and 10*d* are screwed into the pressing pieces 10*c* and 10*c*, respectively, such that a position thereof in an axial direction can be adjusted, and press front ends 8*d* and 8*d* of exhaust rocker levers 8 and 8.

Moreover, an exhaust cam shaft 6 is provided with an exhaust cam phase variable mechanism 16. In the engine according to the fourth embodiment, an exhaust pipe length of each of the first exhaust system 22 and the second exhaust system 23 must be set at a length that a primary pressure wave by blowdown gas from one cylinder unit arrives at an exhaust port of the other cylinder unit at a predetermined timing. With regard to the second exhaust system 23, particularly, the required length can not be ensured readily in some instances. In an operating region where EGR gas supercharging is performed, therefore, it is desirable that the exhaust cam phase variable mechanism 16 retards the phase of the exhaust cam shaft 6 by an amount larger than that on a normal condition. It is to be noted that the intake cam shaft 5 may be provided with a cam phase variable mechanism.

Figure 17:
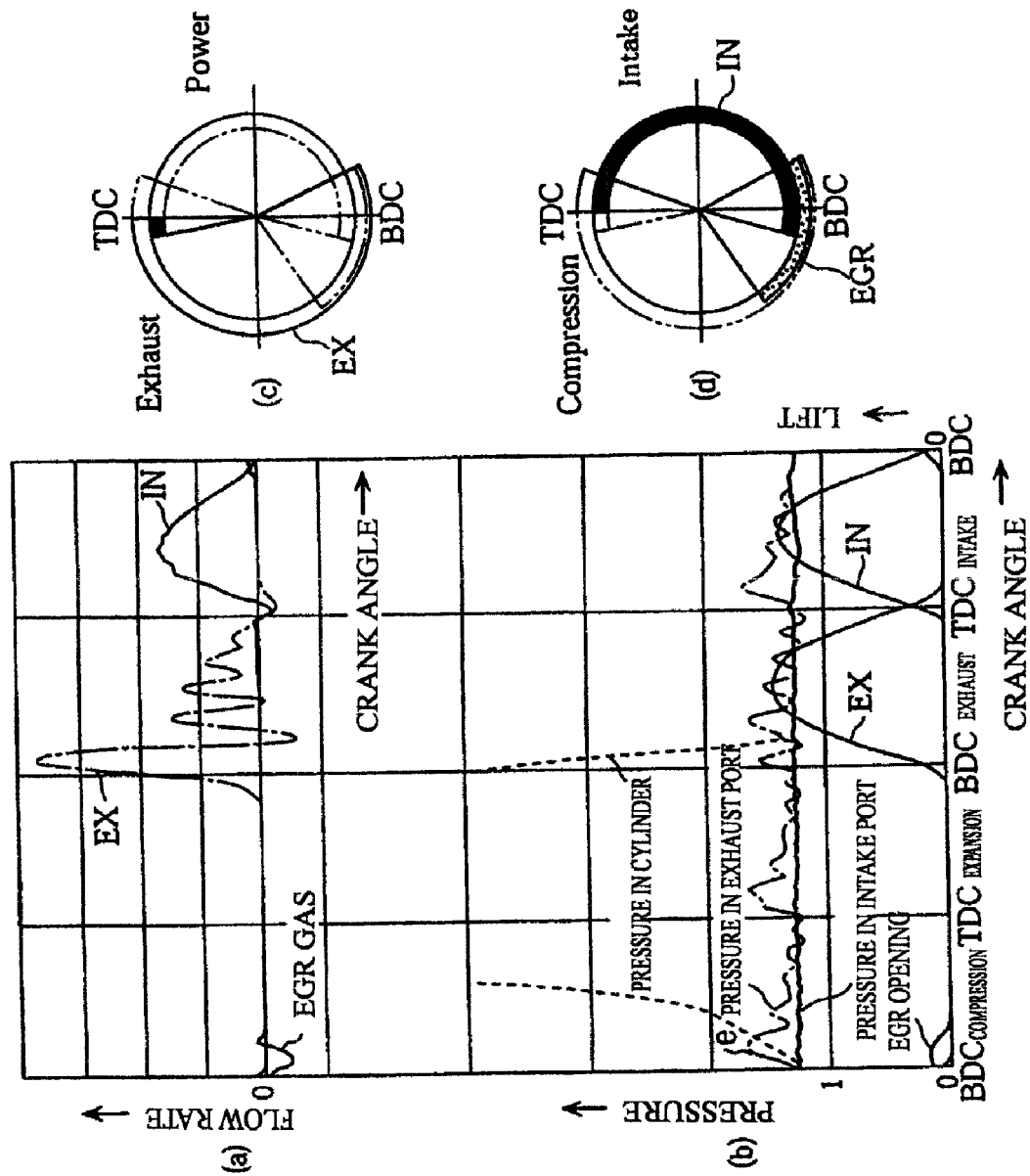
FIG. 17 shows characteristics of the engine according to the fourth embodiment.

FIG. 17 shows a relation between the EGR opening timing and the pressure in the exhaust port in the case where the open timing of the exhaust valve is retarded in transient acceleration (e.g., 1500 rpm of engine rotation speed).

In a case where the exhaust valve open timing is as usual (e.g., 50° BBDC), backflow of fresh air from the intake valve occurs at an overlap period between the intake valve and the EGR opening, resulting in reduction of volume efficiency. In this embodiment, on the other hand, the exhaust valve open timing is retarded to 20° BBDC. As shown in (b) of FIG. 17, therefore, a primary exhaust pressure wave e arrives at a latter half of the EGR opening around the intake bottom dead center. Because of the transient acceleration, an average exhaust pressure is higher than an intake pressure. However, since the primary pressure wave does not arrive yet at the overlap period between the intake valve and the EGR opening, the exhaust pressure is low and no backflow of the fresh air from the intake valve occurs. The exhaust pressure increases after closing the intake valve, so that the EGR gas supercharging is realized. With regard to the aspiration amount of fresh air, there is little difference between a case where the EGR gas supercharging is performed and a case where no EGR opening is performed.

As a result, a combustion temperature decreases by increase in heat capacity of operating gas, so that generation of NOx is suppressed. Simultaneously, generation of soot is prevented by increase in mass of oxygen. It is needless to say that burned gas in EGR gas lowers an oxygen concentration, so that a local combustion temperature decreases and an NOx reducing effect is obtained as in the case of the conventional diesel engine.

Herein, since the exhaust valve open timing is retarded, the pressure in the cylinder at an initial period of the exhaust stroke is high, leading to increase in pump loss. However, deterioration in fuel economy is suppressed, which causes no problems.

Figure 18:
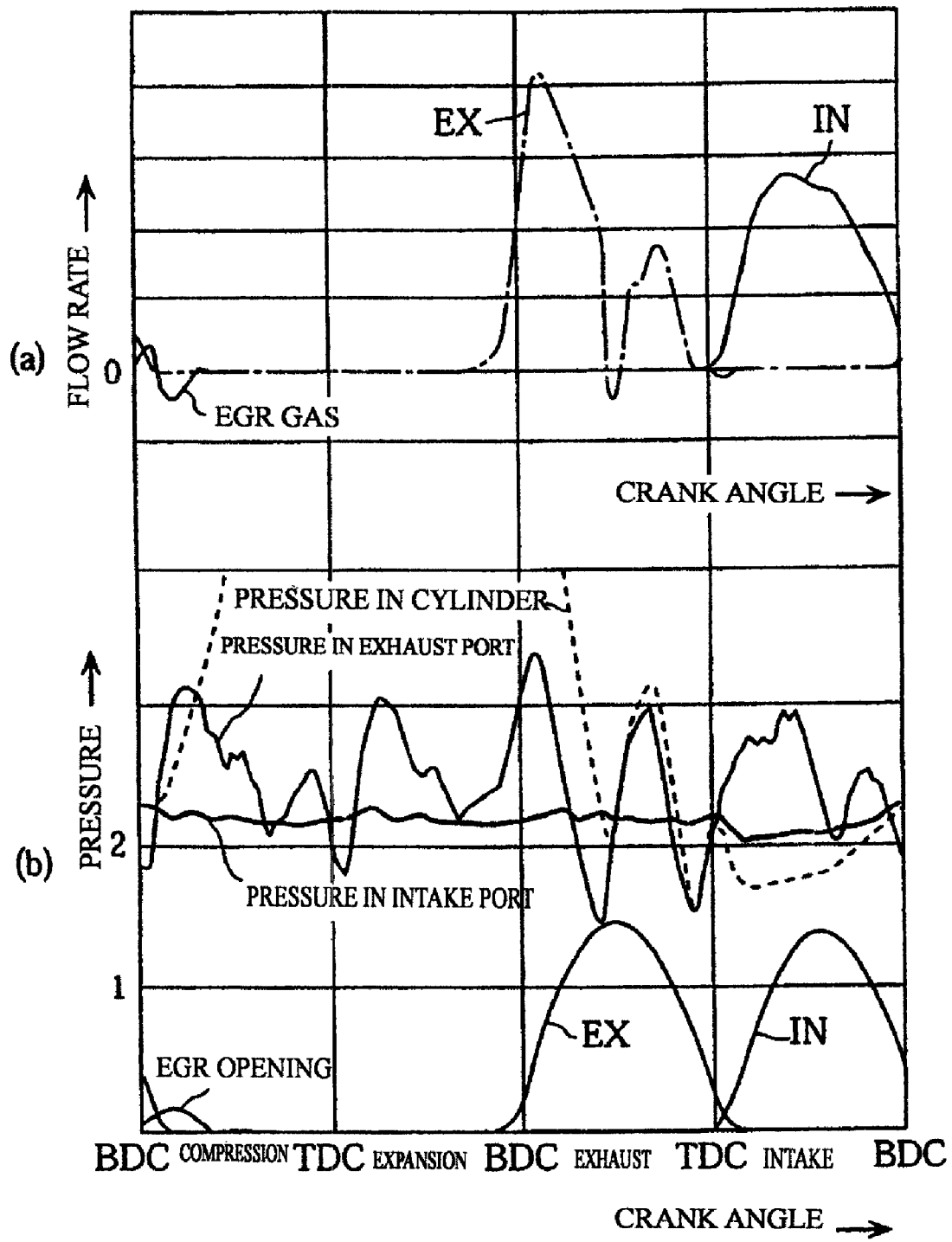
FIG. 18 shows characteristics of the engine according to the fourth embodiment.

FIG. 18 shows a relation between the EGR opening timing and the pressure in the exhaust port in a case where the engine rotation speed is high (e.g., 4000 rpm). When the engine rotation speed becomes high, the primary exhaust pressure wave arrives slowly. Therefore, the exhaust valve open timing must be advanced or the EGR opening timing and the intake valve close timing must be retarded in order to maintain a relation between the exhaust pressure wave and the EGR opening timing.

In this example, as compared with the case of low rotation (1500 rpm), the exhaust valve open timing is retarded by 5° in order to reduce exhaust pump loss and each of the EGR opening timing and the intake valve close timing is retarded by 15°, so that an intake flow rate increases around the intake bottom dead center, leading to increase in volume efficiency.

Because of a high-rotation and stationary state, an average exhaust pressure is slightly higher than the intake pressure. However, the exhaust pressure at the intake bottom dead center immediately before arrival of the primary pressure wave is lower than the intake pressure and no backflow of intake gas occurs. The exhaust pressure wave arrives after the intake valve is closed, so that the EGR gas is pushed into the exhaust port. However, since the EGR opening time area is small at the high rotation speed, the EGR gas supercharging effect is not large. Moreover, since the exhaust valve open timing is too early, the exhaust pump loss increases. However, it is considered that such loss falls within an allowable range because fuel economy performance is not important so much in the case of high rotation speed and high output.

Of course, the mechanism for switching the EGR opening allows determination of the phase of the exhaust cam and that of the intake cam irrespective of the EGR opening, so that higher output can be obtained.

Figure 16:
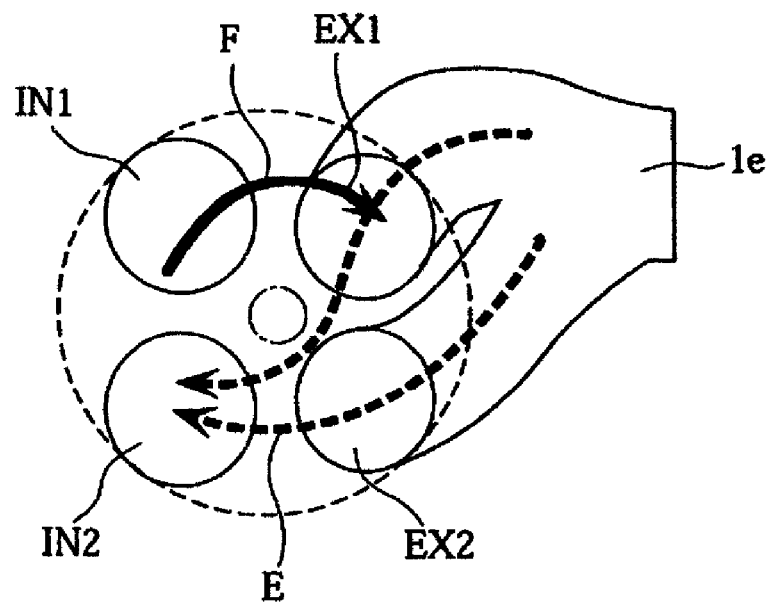
FIG. 16 schematically shows a shape of an exhaust port of the engine.

As shown in FIG. 16, moreover, an exhaust port 1e according to this embodiment is a tangential port that generates a swirl flow E flowing about a cylinder unit axis when the EGR gas is fed into the cylinder. In light of compatibility between reduction in resistance loss upon drain of the exhaust gas and weak swirl upon backflow of the EGR gas, the tangential port is more desirable than a helical port. A turning direction of the swirl flow F of the EGR gas is equal to a turning direction of a swirl flow F generated by a fresh air flow from the intake valve.

In the engine 1 according to this embodiment, a turbine nozzle is throttled at starting and idling in order to increase an exhaust pressure, and then EGR gas supercharging is performed to ensure a compression temperature and a pressure each required for combustion. Therefore, a low compression ratio which is advantageous to an HCCI operation can be obtained. A throttling amount of the turbine nozzle is controlled by feedback controlling an exhaust valve pressure on the basis of a signal from the pressure sensor 2r such that this amount takes a target value according to a water temperature of the engine.

In the fourth embodiment, the exhaust primary pressure wave and the exhaust throttling are used in combination, so that reduction in amount of fresh air to be aspirated can be minimized and a large amount of EGR gas can be fed.

In this embodiment, the complicated valve mechanism and the variable mechanism therefor are set. However, if allowance is made for deterioration in performance to a degree, the object of the present invention can be achieved by a simple mechanism only by adding a cam for EGR opening to an exhaust cam of a normal valve mechanism.

Figure 21:
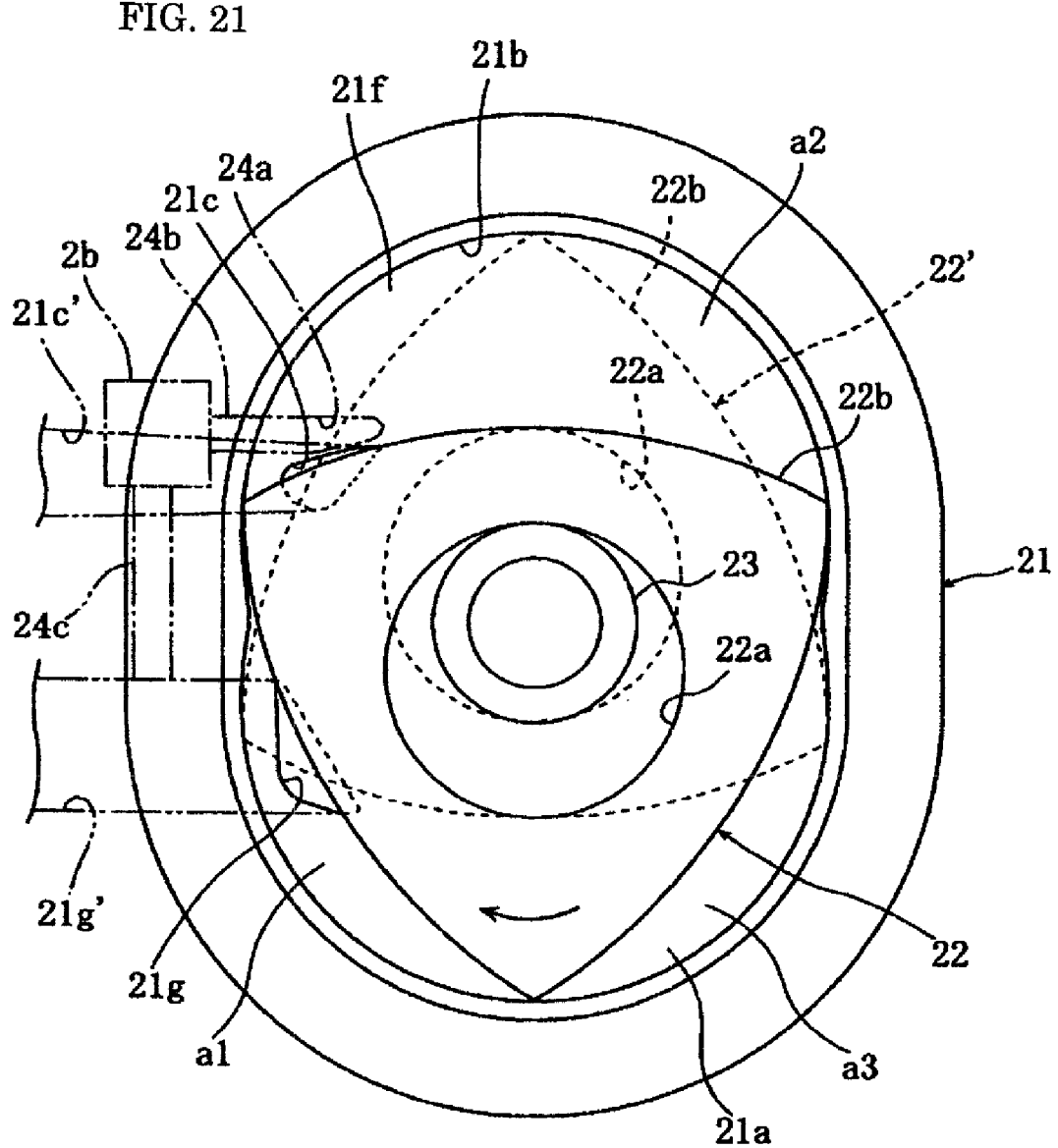
FIG. 21 shows a schematic sectional front view of a rotary engine according to a fifth embodiment of the present invention.
Figure 22:
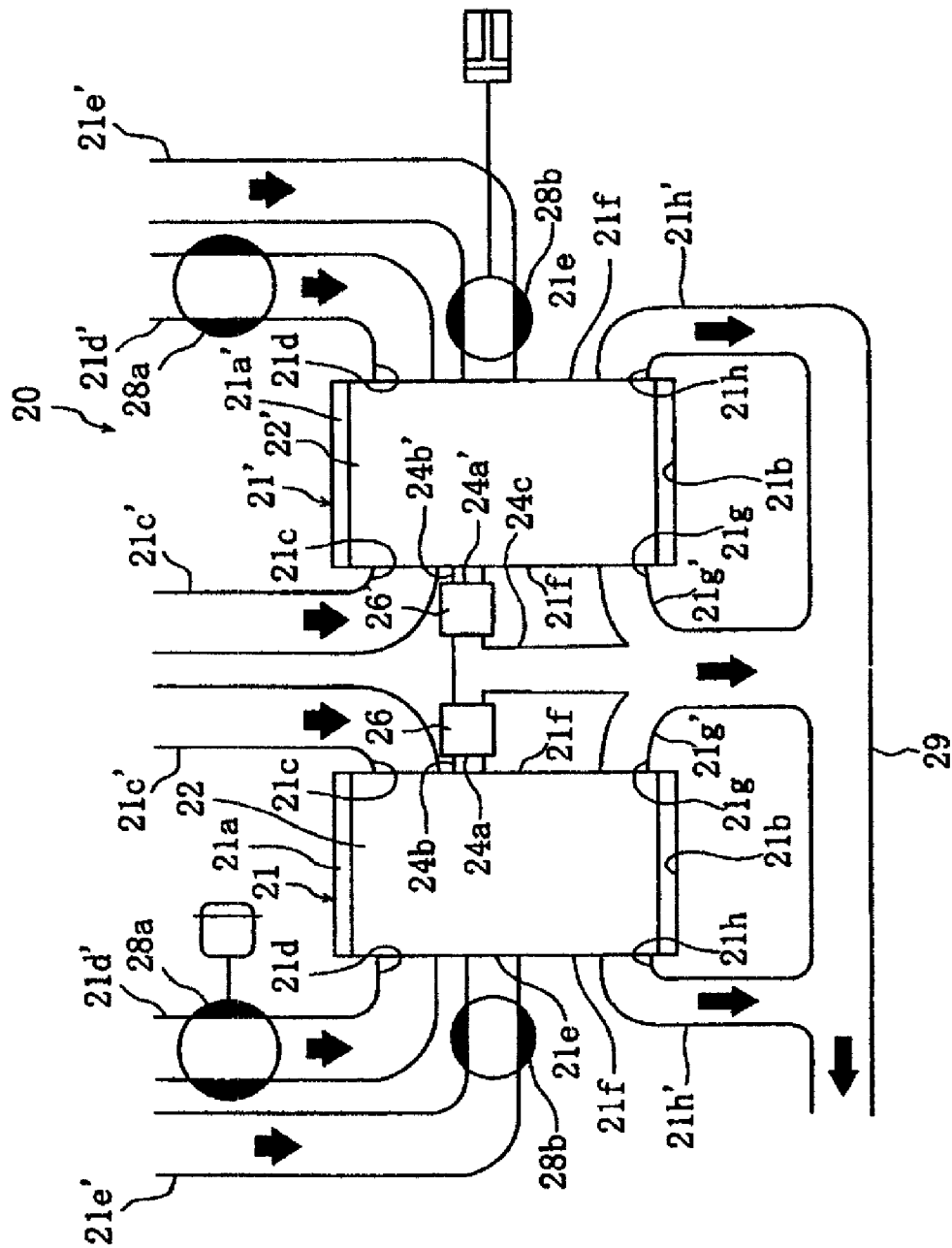
FIG. 22 shows a schematic sectional plan view of the engine according to the fifth embodiment.

FIGS. 21 and 22 show a fifth embodiment of the present invention. The fifth embodiment describes an example of blowdown supercharging in a rotary engine configured to perform an HCCI operation.

As shown in the figures, a rotary engine 20 is of a 2-rotor and 6-port type. In the rotary engine 20, oval rotor chambers 21a and 21a' are formed inside rotor housings 21 and 21', respectively, and triangular rotors 22 and 22' are arranged inside the rotor chambers 21a and 21a' so as to be rotatable in a clockwise direction in FIG. 21, respectively. Each of the rotors 22 and 22' has a rotor gear 22a meshed with a fixed gear 23. When the rotors 22 and 22' rotate so as to slide on inner circumferential faces 21b and 21b of the rotor chambers 21a and 21a', respectively, an eccentric shaft (not shown) is rotated, so that output is produced.

Three spaces surrounded by outer peripheral faces 22b and 22b of the rotors 22 and 22', the inner circumferential faces 21b and 21b of the rotor chambers 21a and 21a', and sidewalls 21f and 21f are defined as combustion chambers a1, a2 and a3, respectively.

Moreover, first, second and third intake ports 21c, 21d and 21e, and first and second exhaust ports 21g and 21h are formed on the sidewalls 21f and 21f of the rotor housings 21 and 21'. First, second and third intake passages 21c', 21d' and 21e' are connected to the first, second and third intake ports 21c, 21d and 21e, respectively. Shutter valves 28a and 28b are provided on the second and third intake passages 21d' and 21e', respectively. Exhaust passages 21g' and 21h' are connected to the exhaust ports 21g and 21h, respectively, and are merged with an exhaust merging passage 29.

Herein, each of the rotors 22 and 22' of the rotor chambers 21a and 21a' has a phase difference (rotation angle: 540°) of a half cycle. Then, EGR ports 24a and 24a' are formed on the rotor chambers 21a and 21a', respectively, at a position near a compression stroke starting position of the combustion chamber. The EGR ports 24a and 24a' are connected to a merged portion of the exhaust passages 21g' and 21g' through exhaust and feed branch passages 24b and 24b' and an exhaust and feed merging passage 24c. EGR control valves 26 and 26' each of which is a solenoid valve are provided on the exhaust and feed branch passages 24b and 24b', respectively.

In the rotary engine according to this embodiment, the second and third intake passages 21d' and 21e' are closed by the first and second shutter valves 28a and 28b, respectively, in a low-speed rotation region, so that air is aspirated from only the first intake port 21c. The first shutter valve 28a of the second intake passage is opened in a middle-speed rotation region. Further, the second shutter valve 28b is also opened in an high-speed rotation region.

In this embodiment, when the rotor 22 of the rotor chamber 21a is in a compression initial state (a state that the intake port 21c is substantially closed) shown by a solid line, the rotor 22' of the rotor chamber 21a' is in an expansion stroke terminal period state (a state that the exhaust port 21g is slightly opened) shown by a broken line. When the rotor 22' opens the exhaust port 21g, a high-pressure exhaust port pressure wave is generated. When the EGR control valve 26 is opened, the exhaust port pressure wave passes through the exhaust and feed branch passage 24b, so that the exhaust gas can be pushed into the combustion chamber at an initial stage of the compression stroke. Thus, an amount of internal EGR gas can be increased without reduction in amount of fresh air.

In this embodiment, the EGR control valves 26 and 26' which can be opened/closed at an optional timing are provided on the exhaust and feed branch passages 24b and 24b', respectively. Therefore, the exhaust pressure wave can be supplied into the combustion chamber at a desired timing.

Moreover, an ignition timing in the HCCI operation can be controlled by adjusting the amount of internal EGR gas and a supercharging pressure.

What is claimed is:

1. A four-cycle engine configured to cause backflow of a high-pressure exhaust gas from a second cylinder unit into a first cylinder unit by EGR so that an exhaust valve of the first cylinder unit is reopened around a bottom dead center from an intake stroke to a compression stroke of the first cylinder unit, and to set a pressure in the first cylinder unit to be higher than a pressure in an intake port at a start of the compression stroke of the first cylinder unit, wherein
an average pressure in an exhaust port at an overlap period during which the exhaust valve of the first cylinder unit is in an EGR opening period overlaps with a period during which an intake valve of the first cylinder unit is in an open position, wherein the average pressure in the exhaust port at the overlap period is set to be lower than an average pressure in the exhaust port within the EGR opening period and after a lapse of the overlap period.

2. The four-cycle engine according to claim 1, wherein
the first and second cylinder units are different in phase from each other by a half cycle and are connected to a common exhaust system, and
an EGR opening timing and the EGR opening period of the exhaust valve of the first cylinder unit, an exhaust valve open timing in an expansion stroke of the second cylinder unit, and a length of an exhaust passage provided between the first and second cylinder units are set such that most of a primary pressure wave from an exhaust blowdown from the second cylinder unit arrives at an opening portion of the exhaust valve of the first cylinder unit within the EGR opening period of the exhaust valve of the first cylinder unit and after the overlap period, in at least a middle-load operating region.

3. The four-cycle engine according to claim 1, wherein
the common exhaust system connected to the first and second cylinder units includes an exhaust throttling mechanism that increases a back pressure of common exhaust system to cause the backflow of the high-pressure exhaust gas into the first cylinder unit, and
in the exhaust valve of the first cylinder unit, a lift amount at a central point where lift curves intersect in the overlap period is set to be less than or equal to a half of a maximum lift amount in the EGR opening period.

4. The four-cycle engine according to claim 1, wherein
the common exhaust system connected to the first and second cylinder units includes an exhaust throttling mechanism that increases a back pressure of the common exhaust system to cause the backflow of the high-pressure exhaust gas into the first cylinder unit,
the intake valve of the first cylinder unit is closed after bottom dead center, and
the exhaust valve of the first cylinder unit is opened before the intake valve of the first cylinder unit is closed and achieves maximum lift after the intake valve of the first cylinder unit is closed, during the EGR opening period.

5. The four-cycle engine according to claim 3, wherein
the exhaust throttling mechanism is at least one of a west gate-equipped and a variable nozzle-type turbocharger having a turbo lag characteristic such that an increase in an intake pressure is slower than an increase in an exhaust pressure in a transient acceleration operating region, and at least one of the west gate and the variable nozzle-type turbo charger is controlled in a direction that exhaust resistance increases.

6. The four-cycle engine according to claim 4, wherein
when at least one of an EGR opening timing of the exhaust valve of the first cylinder unit, a close timing of the intake valve of the first cylinder unit, and an open timing of the exhaust valve of the second cylinder unit in an expansion stroke is changed, and wherein an amount of fresh air to be fed into the first cylinder unit, an amount of EGR gas to be fed into the first cylinder unit and the pressure in the first cylinder unit at the start of the compression stroke of the first cylinder unit are controlled.

7. The four-cycle engine according to claim 6, further comprising:
an exhaust cam shaft and an intake cam shaft;
an EGR cam formed on the intake cam shaft to reopen the exhaust valve of the first cylinder unit around the bottom dead center of the intake stroke;
an exhaust valve driving mechanism transmitting the operation of the EGR cam to the exhaust valve; and
a cam phase variable mechanism changing a phase of at least one of the intake cam shaft and the exhaust cam shaft, wherein
when the phase of the intake cam shaft and the phase of the exhaust cam shaft are changed, the EGR opening of the exhaust valve of the first cylinder unit, the close timing of the intake valve of the first cylinder unit and the open timing of the exhaust valve of the second cylinder unit in the expansion stroke are changed, so that an amount of fresh air to be fed into the first cylinder unit, an amount of EGR gas to be fed into the first cylinder unit and a pressure in the cylinder at a start of the compression stroke of the first cylinder unit are controlled.

8. The four-cycle engine according to claim 7, wherein
in a high-load operating region, the phase of at least one of the intake cam shaft and the exhaust cam shaft are controlled such that most of a primary pressure wave by an exhaust blowdown from the second cylinder unit arrives at an opening portion of the exhaust valve of the first cylinder unit after a substantial lapse of the EGR opening period of the first cylinder unit.

9. The four-cycle engine according to claim 7, wherein
in a low-load operating region, the phase of at least one of the intake cam shaft and the exhaust cam shaft are controlled such that the intake valve of the first cylinder unit is closed before bottom dead center and most of a primary pressure wave by an exhaust blowdown from the second cylinder unit arrives at an opening portion of the exhaust valve of the first cylinder unit during the EGR opening period of the first cylinder unit.

10. The four-cycle engine according to claim 7, wherein
the exhaust valve driving mechanism is configured to switch on or switch off transmission of a driving force from the EGR cam to the exhaust valve of the first cylinder unit.

11. The four-cycle engine according to claim 4, wherein
guide parts for suppressing a feed of the EGR gas are formed at left and right edges of the opening portion of the exhaust valve in a cam axis direction, and the EGR gas is oriented by the guide parts so as to be concentrated on a center of a cylinder in the cam axis direction when being fed into the cylinder.

12. The four-cycle engine according to claim 1, wherein
a tumble flow is generated when the EGR gas flows into the cylinder, and a turning direction of the tumble flow is equal to a turning direction of a tumble flow generated by a fresh air flow from the intake valve.

13. The four-cycle engine according to claim 4, wherein
the exhaust port is a tangential port generating a swirl flow flowing about a cylinder unit axis when the EGR gas flows into the cylinder, and a turning direction of the swirl flow of the EGR gas is equal to a turning direction of a swirl flow generated by a fresh air flow from the intake valve.

* * * * *